(12) United States Patent
Nakano et al.

(10) Patent No.: US 8,902,473 B2
(45) Date of Patent: Dec. 2, 2014

(54) RECORDING APPARATUS

(71) Applicant: Seiko Epson Corporation, Tokyo (JP)

(72) Inventors: Yosuke Nakano, Shiojiri (JP); Atsuhiko Takeuchi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/851,747

(22) Filed: Mar. 27, 2013

(65) Prior Publication Data

US 2013/0258416 A1    Oct. 3, 2013

(30) Foreign Application Priority Data

Mar. 30, 2012  (JP) ................................. 2012-079655

(51) Int. Cl.
| | |
|---|---|
| *H04N 1/04* | (2006.01) |
| *B65H 29/00* | (2006.01) |
| *B41J 13/10* | (2006.01) |
| *H04N 1/00* | (2006.01) |

(52) U.S. Cl.
CPC ........... *H04N 1/00631* (2013.01); *B65H 29/00* (2013.01); *B41J 13/106* (2013.01); *H04N 2201/0082* (2013.01); *H04N 2201/0093* (2013.01)
USPC ............ 358/296; 358/474; 358/496; 358/497

(58) Field of Classification Search
USPC .......................... 358/296, 474, 496, 497, 498
See application file for complete search history.

(56) References Cited

U.S. PATENT DOCUMENTS

| | | | |
|---|---|---|---|
| 6,390,701 B2 * | 5/2002 | Osmus .......................... 400/624 |
| 2005/0162494 A1 | 7/2005 | Inokuchi et al. | |

FOREIGN PATENT DOCUMENTS

| | | |
|---|---|---|
| JP | 2004-338873 | 12/2004 |
| JP | 2006-001705 | 1/2006 |

* cited by examiner

*Primary Examiner* — Houshang Safaipour
(74) *Attorney, Agent, or Firm* — Workman Nydegger

(57) ABSTRACT

A recording apparatus includes a recording unit that performs a recording operation on a medium, a discharge unit that discharges the medium that has undergone the recording operation by the recording unit, a medium receiving tray that receives the medium discharged from the discharge unit, the medium receiving tray being shiftable between a first state in which the medium receiving tray is drawn out in a medium discharge direction and a second state in which the medium receiving tray is retracted in a direction opposite to the medium discharge direction, and a blocking mechanism configured to be engaged with the trailing edge of the medium while the medium receiving tray is shifted from the first state to the second state, and to restrict the medium from being drawn inside.

11 Claims, 20 Drawing Sheets

RECORDING APPARATUS

BACKGROUND

1. Technical Field

The present invention relates to a recording apparatus, such as a facsimile machine and a printer, that includes a medium receiving tray for receiving a medium discharged after undergoing a recording operation.

2. Related Art

For example, a printer includes a medium receiving tray, sometimes called a discharged sheet stacker, for receiving and sequentially stacking recording sheets discharged after undergoing a recording operation. Hereinafter, the medium receiving tray may be simply referred to as tray.

Some of existing trays have a multi-level structure that occupies a smaller space when the printer is not in use, but can be extended to secure a larger space for receiving the recording sheet when the printer is activated (for example, see JP-A-2006-001705).

To practically realize a system that automatically draw out the tray from the printer in the medium discharge direction when recording is to be performed on the recording sheets; discharges the recording sheets after the recording to the tray; and then retracts the tray in the direction opposite to the medium discharge direction to the initial position in the printer, the following issue has to be addressed.

In the case where the recording sheets stacked in the tray are not removed before the tray is retracted in the direction opposite to the medium discharge direction, the recording sheets are also drawn into the printer together with the tray. Accordingly, in the case of a low-profile printer it is difficult to take out the recording sheets because the sheet discharge slot is narrow, especially when a small-sized medium is used.

Further, in case that the recording sheet is caught and jammed in the gap between the tray and the frame defining the chamber for the tray, the recording sheet that has undergone the recording operation is seriously damaged, and besides the tray is locked halfway of the returning motion to the initial position. Thus, the printer becomes unable to confirm that the tray has returned to the initial position, resulting in a system error.

In such a case, the system error can only be cancelled when the tray is confirmed to have returned to the initial position, upon restarting the printer and initializing the tray position. Accordingly, the system error is not cancelled unless the jammed recording sheet, which is the cause of the system error, is removed.

If the recording sheet is torn apart by being forcibly pulled and the portion thereof jammed between the tray and the frame remains inside the printer, it is difficult to remove the remainder of the recording sheet unless the housing of the printer is removed to largely expose the internal structure. Therefore, it becomes even more troublesome to cancel the system error. If the tray is forcibly pulled out, the driving mechanism engaged with the tray may be damaged or broken in the process of reengagement.

SUMMARY

An advantage of some aspects of the present invention is provision of a recording apparatus that restricts a recording sheet remaining unremoved on a tray from following the returning motion of the tray, when the tray is retracted in the direction opposite to the medium discharge direction.

In an aspect, the present invention provides a recording apparatus including a recording unit that performs a recording operation on a medium, a discharge unit that discharges the medium that has undergone the recording operation by the recording unit, a medium receiving tray that receives the medium discharged from the discharge unit, the medium receiving tray being shiftable between a first state in which the medium receiving tray is drawn out in a medium discharge direction and a second state in which the medium receiving tray is retracted in a direction opposite to the medium discharge direction, and a blocking mechanism configured to be engaged with the trailing edge of the medium while the medium receiving tray is shifted from the first state to the second state, and to restrict the medium from being drawn inside.

In the thus-configured recording apparatus, the blocking mechanism is engaged with the trailing edge of the medium to restrict the medium from being drawn inside, when tray is retracted in the direction opposite to the medium discharge direction with the medium received therein unremoved. Although a small-sized medium is received in an inner region of the tray and hence difficult to visually recognize, the medium sticks out from the recording apparatus when the tray is retracted therein together with the medium. Therefore, the user can easily notice that the medium has not been removed.

In the foregoing recording apparatus, the blocking mechanism may include a plurality of rib portions formed on an upper face of the medium receiving tray, the rib portions extending in the medium discharge direction and being aligned in a direction intersecting the medium discharge direction, and a plurality of protruding portions formed on a tray chamber in which the medium receiving tray is accommodated, so as to intrude in a space between the rib portions.

With such a configuration, the plurality of rib portions and the protruding portions that intrude in the space between the rib portions constitute a comb-tooth configuration that restricts the medium from being drawn inside. Thus, the blocking mechanism can be achieved with a simple structure, and hence at a low cost.

In the foregoing recording apparatus, the blocking mechanism may include a slit formed in the medium receiving tray so as to extend in the medium discharge direction, and a projecting portion formed on the tray chamber in which the medium receiving tray is accommodated, so as to intrude into the slit and stick out from a medium receiving surface of the medium receiving tray.

With such a configuration, the projecting portion is engaged with the trailing edge of the medium to thereby restrict the medium from being drawn inside. Thus, the blocking mechanism can be achieved with a simple structure, and hence at a low cost.

In the foregoing recording apparatus, the projecting portion may be formed so as to penetrate through the medium receiving surface of the medium receiving tray and stick out from the medium receiving surface.

In the foregoing recording apparatus, the blocking mechanism may include a cut-away portion formed in the medium receiving tray, a flap provided in the tray chamber in which the medium receiving tray is accommodated, so as to swing between a laid-down position and an upright position, and a biasing unit that urges the flap toward the upright position. The flap is pressed down so as to take the laid-down position by the medium receiving tray when the medium receiving tray is in the second state. When the medium receiving tray is shifted from the second state to the first state, the cut-away portion allows the flap to swing so as to take the upright position from the laid-down position, and to maintain the upright position until the cut-away portion passes the flap while the medium receiving tray is shifted from the first state to the second state.

With such a configuration, the flap is engaged with the trailing edge of the medium to restrict the medium from being drawn inside. Thus, the blocking mechanism can be achieved with a simple structure, and hence at a low cost.

In the foregoing recording apparatus, the medium receiving tray may include a sloped portion formed on a downstream side in the medium discharge direction, so as to upwardly incline the leading edge of the medium.

In the case where the medium is small in size such as a postcard, the medium of the postcard size is received in a deep region of the medium receiving tray. Accordingly, it is difficult to visually recognize the medium and the user may fail to collect the medium. With the mentioned configuration, however, when the tray returns to the initial position inside the recording apparatus the medium does not follow the tray but is lifted along the sloped portion and sticks out from the recording apparatus, thus to prevent the user from leaving the medium uncollected.

In the foregoing recording apparatus, the blocking mechanism may include a plurality of sets of the rib portions and the protruding portions, each set including two rib portions and one protruding portion located therebetween.

With the plurality of sets each including two rib portions and one protruding portion located therebetween, the medium is prevented from skewing (being obliquely oriented) when blocked by the blocking mechanism, and hence from being drawn inside because of a skewed orientation.

In the foregoing recording apparatus, the blocking mechanism may include a plurality of sets of the slit and the corresponding projecting portion.

With such a configuration, the plurality of projecting portions are respectively engaged with a plurality of positions of the trailing edge of the medium, to thereby prevent the medium from skewing when blocked by the blocking mechanism, and hence from being drawn inside because of a skewed orientation.

In the foregoing recording apparatus, regions between the rib portions constituting the plurality of sets may be formed in different depths.

Such a configuration increases the sectional coefficient of the medium receiving tray in the width direction, and disperses stress generated by an external force, thereby enabling the necessary strength to be secured.

In the foregoing recording apparatus, the front edge of the protruding portion may be formed as a right-angled corner, and the corner portion of the upper surface of the medium receiving tray that passes under the protruding portion may be chamfered.

Such a configuration makes it even less likely that the medium is drawn into between the tray and the tray chamber.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
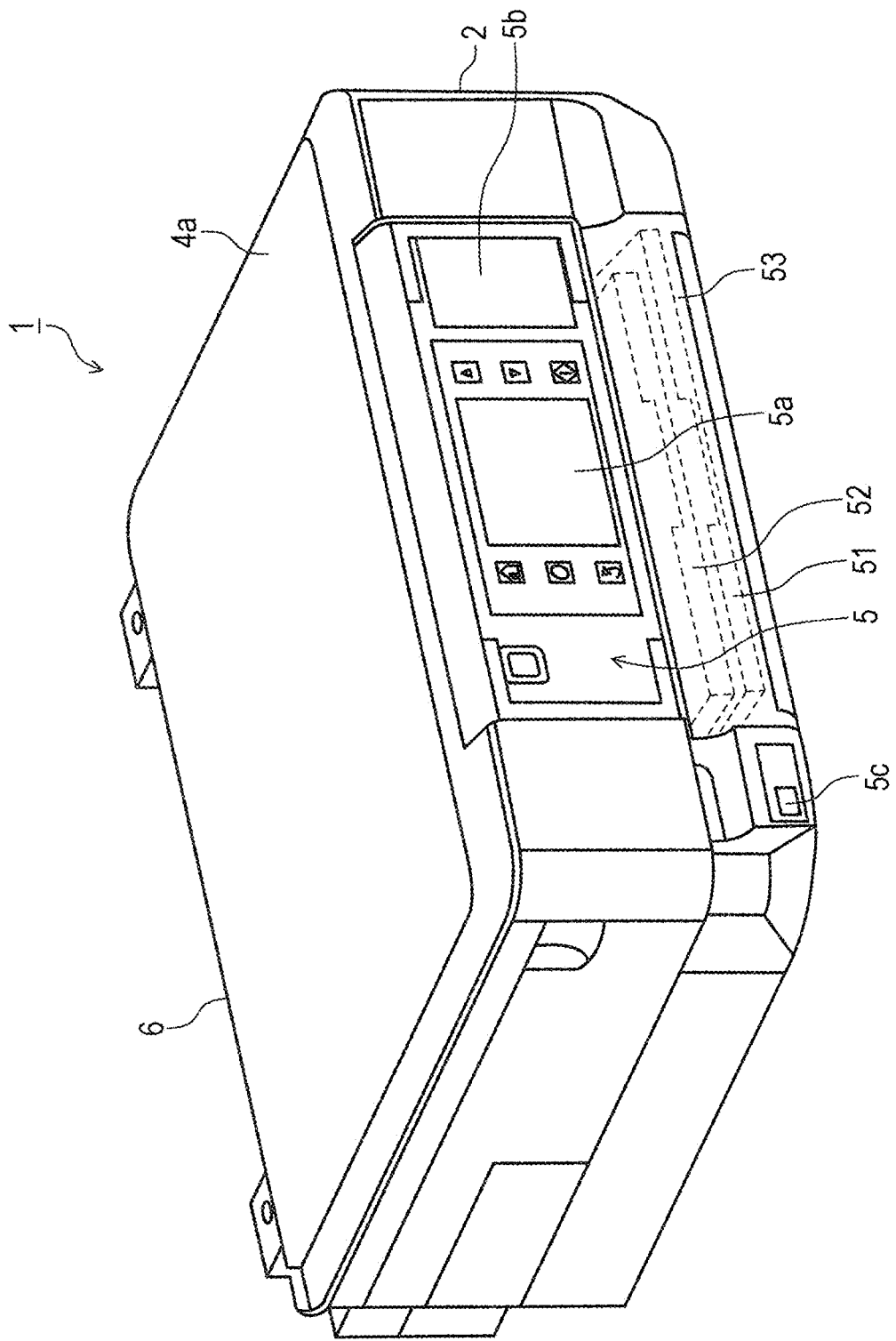
FIG. 1 is a perspective view showing an appearance of an ink jet printer according to a first embodiment of the present invention.

Hereafter, a plurality of embodiments of the present invention will be described referring to the drawings. It is to be noted that the present invention is in no way limited to the embodiments described below but various modifications may be made within the scope defined by the appended claims, and such modifications will also be included in the present invention.

First Embodiment

Figure 2:
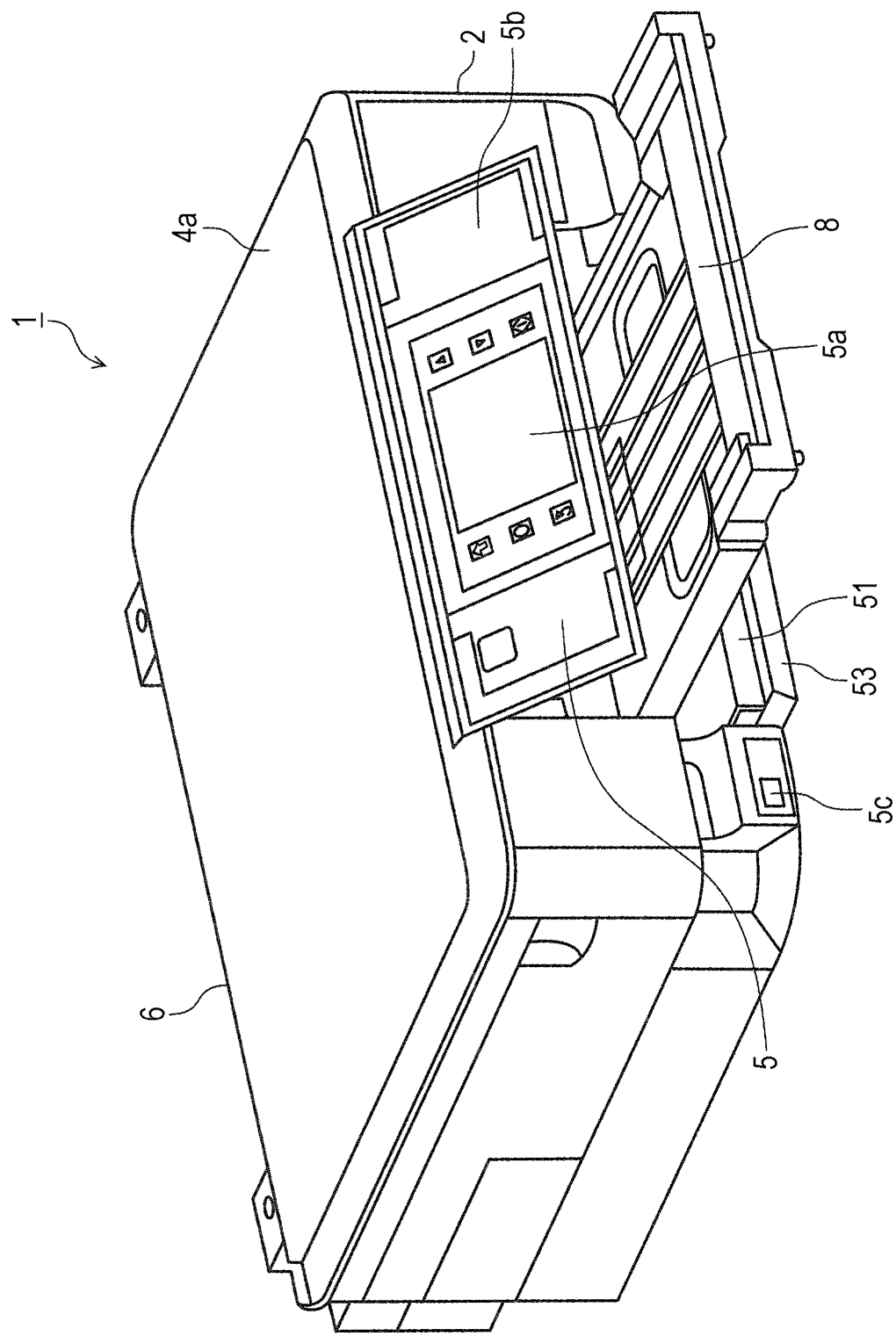
FIG. 2 is a perspective view showing an appearance of the ink jet printer shown in FIG. 1 in an operating condition.
Figure 3:
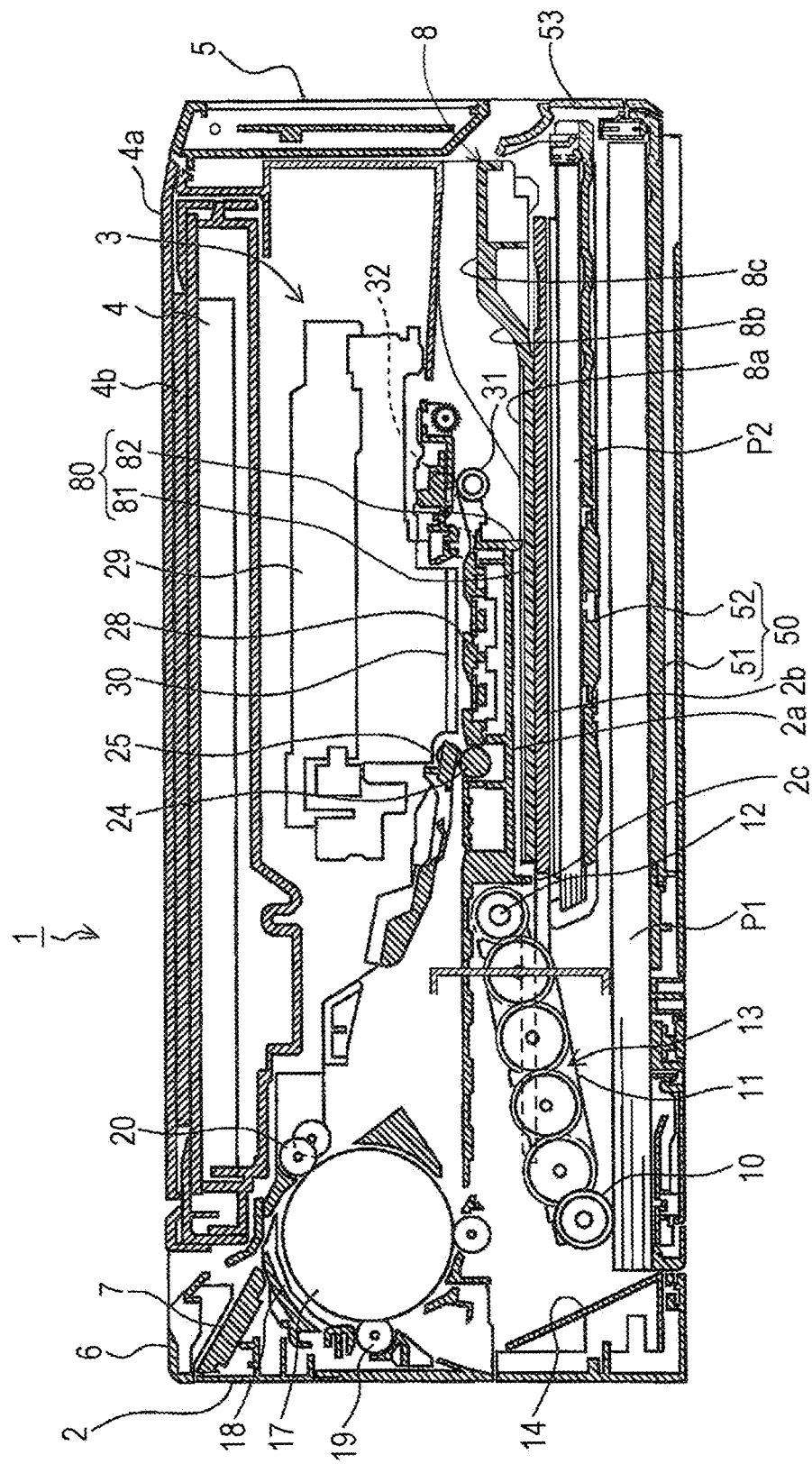
FIG. 3 is a side cross-sectional view of the ink jet printer shown in FIG. 1 taken along the medium transport route, in a non-operating condition.
Figure 4:
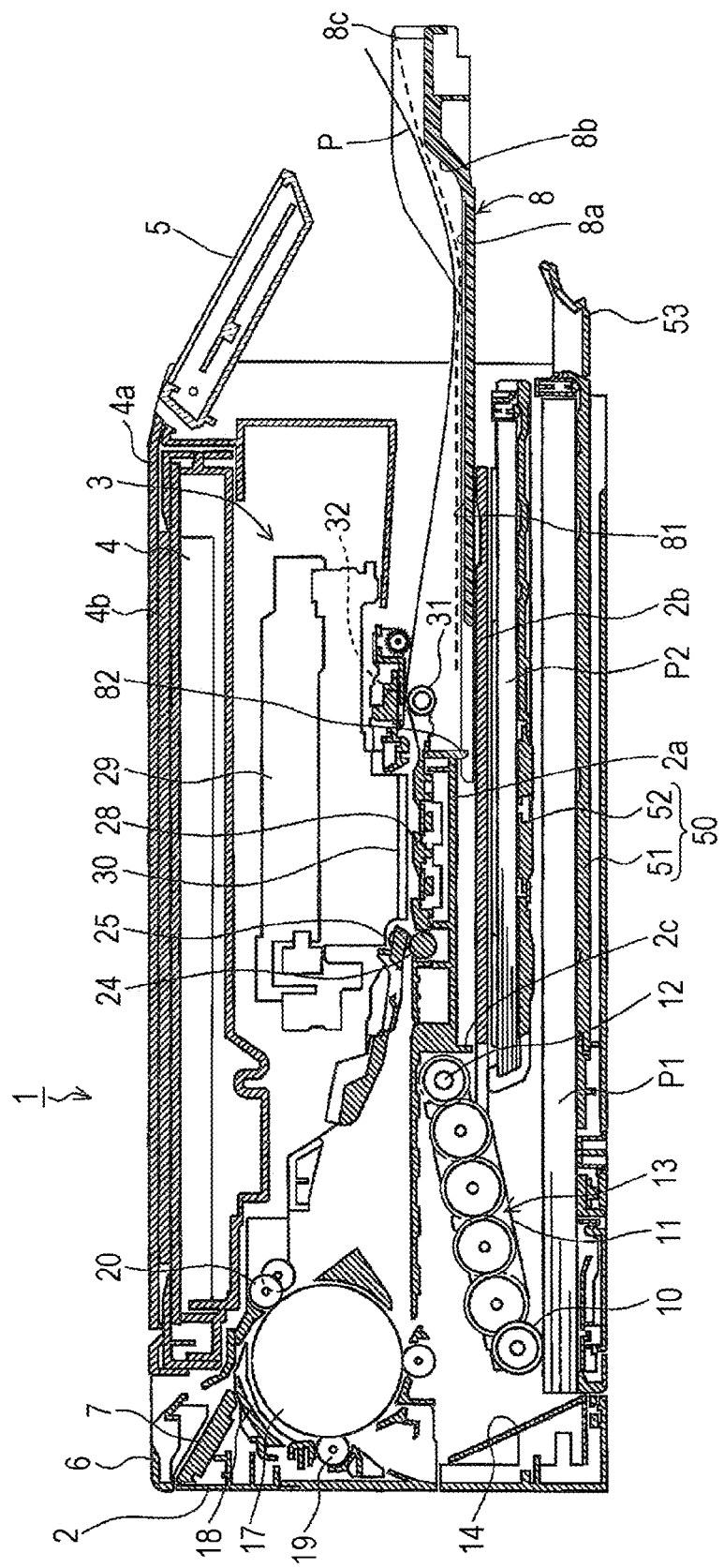
FIG. 4 is a side cross-sectional view of the ink jet printer shown in FIG. 1 taken along the medium transport route, in the operating condition.

FIG. 1 is a perspective view showing an appearance of an ink jet printer 1 (hereinafter, simply "printer") exemplifying the recording apparatus according to the present invention. FIG. 2 is a perspective view showing the appearance of the printer 1 in an operating condition. FIGS. 3 and 4 are side cross-sectional views of the printer 1 taken along the medium transport route. FIG. 4 illustrates a first state (in the operating condition) in which a medium receiving tray 8 is drawn out. Here, a container in which paper sheets are placed is called in various names such as "cassette" and "tray", among which the term "cassette" will hereinafter be adopted.

Figure 5:
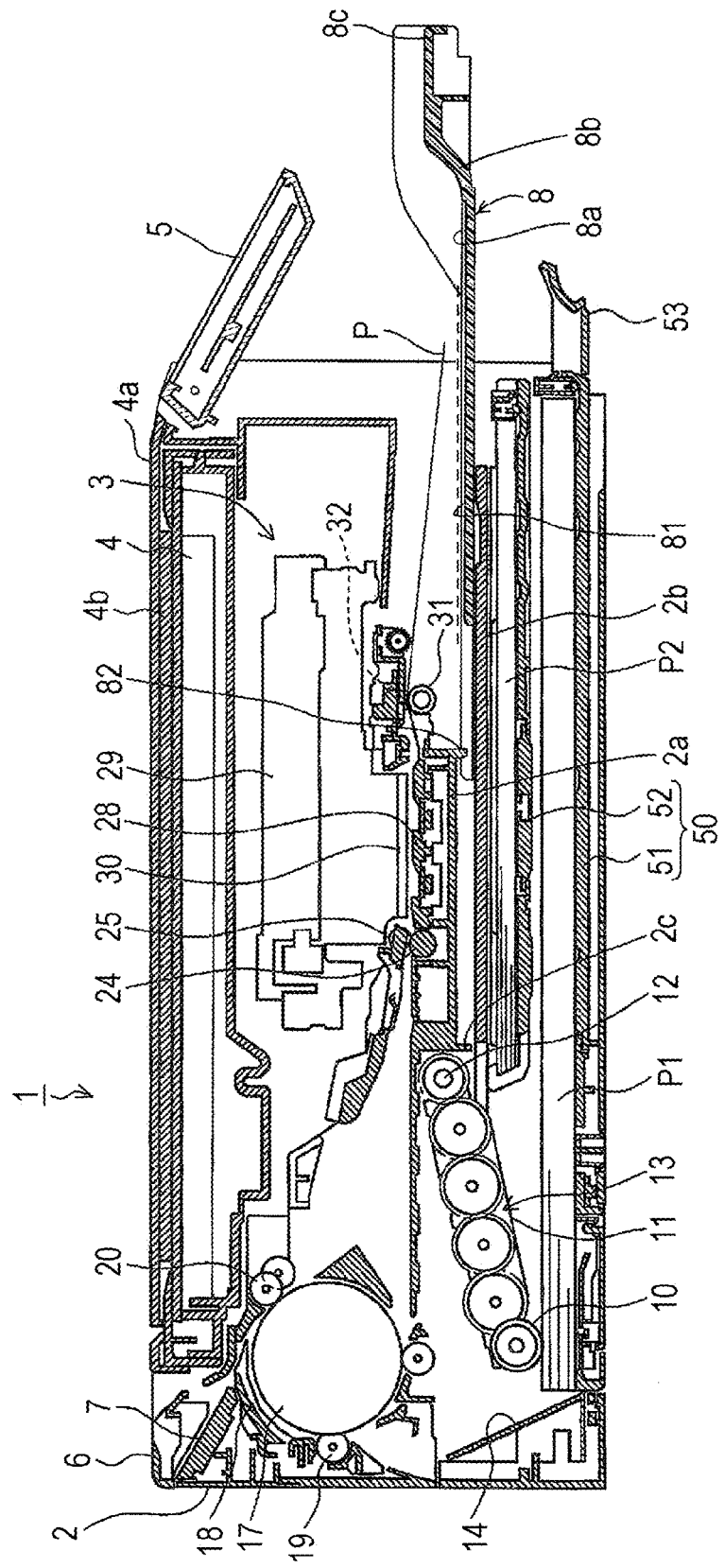
FIG. 5 is a side cross-sectional view of the ink jet printer shown in FIG. 1 taken along the medium transport route, halfway from the operating condition back to the non-operating condition.

Referring to FIGS. 1 to 5, the overall configuration of the printer 1 will be described. FIG. 2 illustrates a second state in which the medium receiving tray 8 is set inside the printer 1 (non-operating condition). FIG. 5 illustrates a transition state between the first state and the second state, in which the medium receiving tray 8 is being retracted into the printer 1 after a printing operation. The printer 1 includes a main body 2 containing therein a printing mechanism (recording unit) 3 that performs ink jet recording on a paper sheet, which exemplifies the medium. The printer 1 also includes a scanner unit 4 installed in an upper portion of the main body 2, and is thus constituted as a multifunction apparatus having both the ink jet recording function and the scanning function.

The scanner unit 4 has a pivotable structure with respect to the main body 2, so as to take a closed position (FIG. 1) and an open position (not shown) by manual pivoting operation.

The scanner unit 4 includes a scanner cover 4a constituting the topmost surface, which can be manually opened and closed, and a source document table 4b that appears when the scanner cover 4a is opened.

Figure 8:
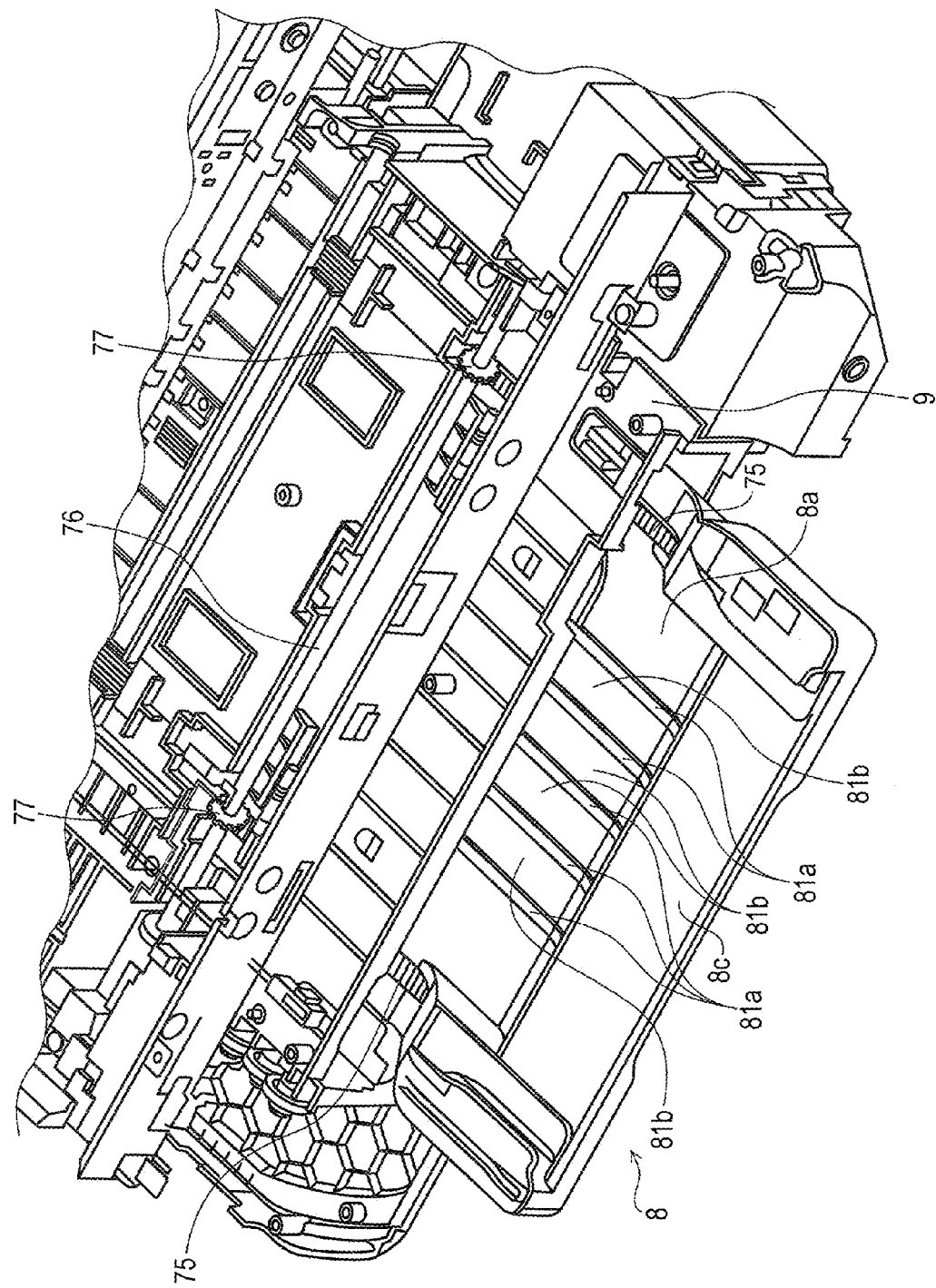
FIG. 8 is a perspective view showing the medium receiving tray drawn out from a frame constituting a main body.

The printer 1 includes an operation panel 5 provided on a front face of the main body 2. The operation panel 5 includes, as shown in FIG. 8, an information display unit (for example, an LCD panel) 5a and an operation setting unit 5b. The former serves to display various types of information such as a user interface for setting printing conditions and images to be printed, and previews of printing conditions that have been set and the image to be printed. The latter includes a power button, printing execution button, and operational buttons for setting the printing conditions.

The operation panel 5 has upper lateral end portions supported by the main body 2, and a motor 78 (FIG. 7) mounted in the main body 2 swings the operation panel 5 before the medium receiving tray 8 is drawn out from the front face of the printer 1, such that the lower end portion of the operation panel 5 opens upward to avoid interference with the movement of the medium receiving tray 8. After the printing operation is finished and the medium receiving tray 8 is retracted to the initial position inside the printer 1, the motor 78 reversely rotates to close the operation panel 5. In the printer 1 according to this embodiment, as will be described later, the motor 78 shown in FIG. 7 serves as the driving source of the medium receiving tray 8, and also drives the operation panel 5 to pivotally swing via transmission gears (not shown).

Referring now to FIGS. 3 and 4, the printing mechanism (recording unit) 3 will be described hereunder. The printing mechanism 3 includes the medium receiving tray 8, a pickup roller 10, an intermediate roller 17, a transport drive roller 24, a transport slave roller 25, a paper sheet support member 28, a recording head 30, a discharge drive roller 31, a discharge slave roller 32, and a medium cassette 50, each of which will be specifically described later.

The printer 1 includes an openable cassette cover 53 located under the operation panel 5 of the main body 2. The cassette cover 53 can be set in a closed position (FIGS. 1, 3) and an open position (FIGS. 2, 4). In the closed position the cassette cover 53 is in contact with a lower end portion of an outer face of a lower cassette 51 (described later) so as to close a cassette insertion slot provided in the lower portion of the front face of the main body 2, and in the open position the medium receiving tray 8 and the upper and lower cassettes 51, 52 are exposed.

The medium receiving tray 8 is slidably supported by a frame 9 (FIG. 8) constituting the base structure of the main body 2, via respective lateral end portions (end portions in a direction intersecting the paper sheet discharge direction, i.e., width direction of the paper sheet).

Figure 6:
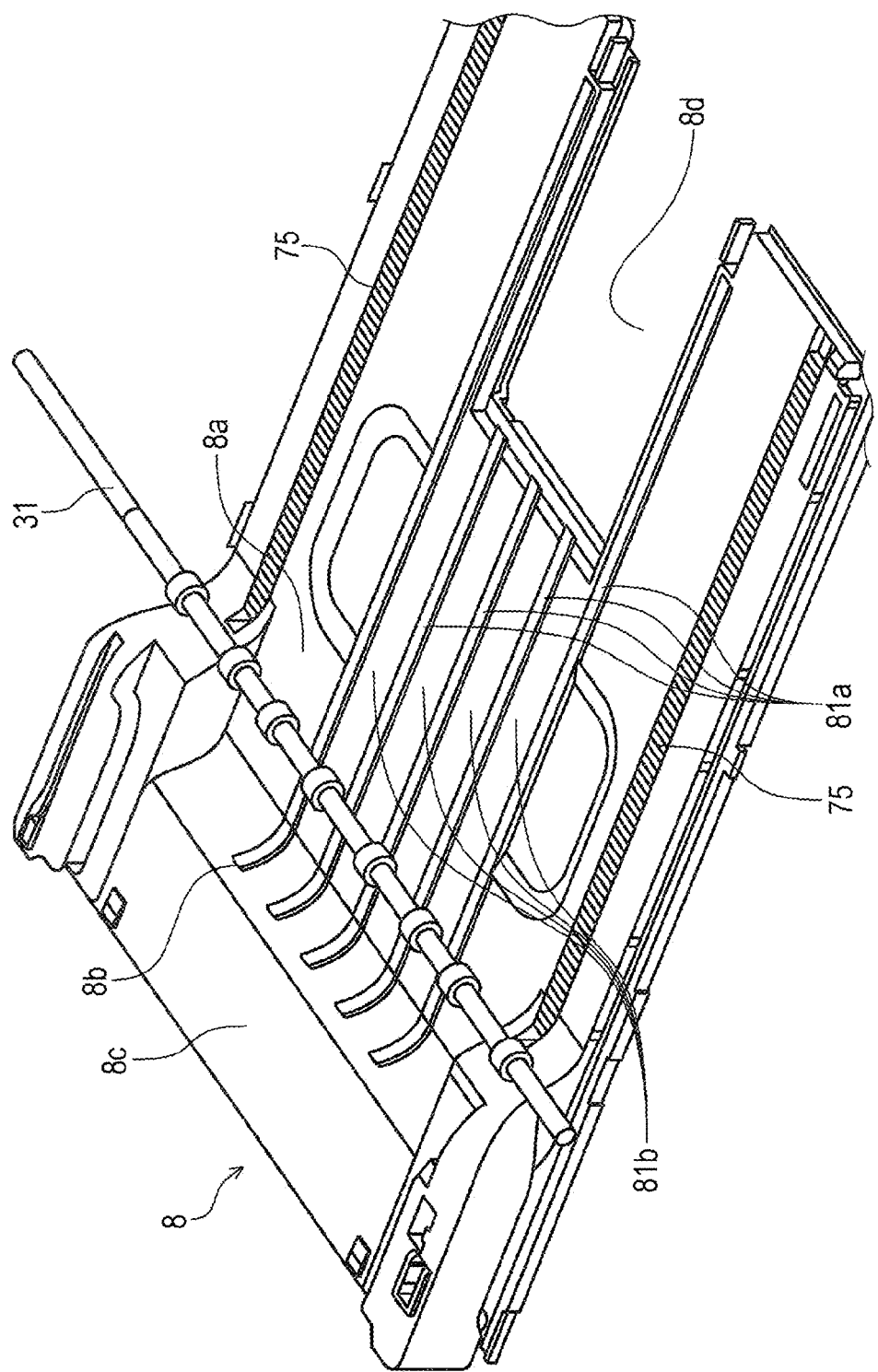
FIG. 6 is a perspective view showing a medium receiving tray, an essential part of the present invention.
Figure 7:
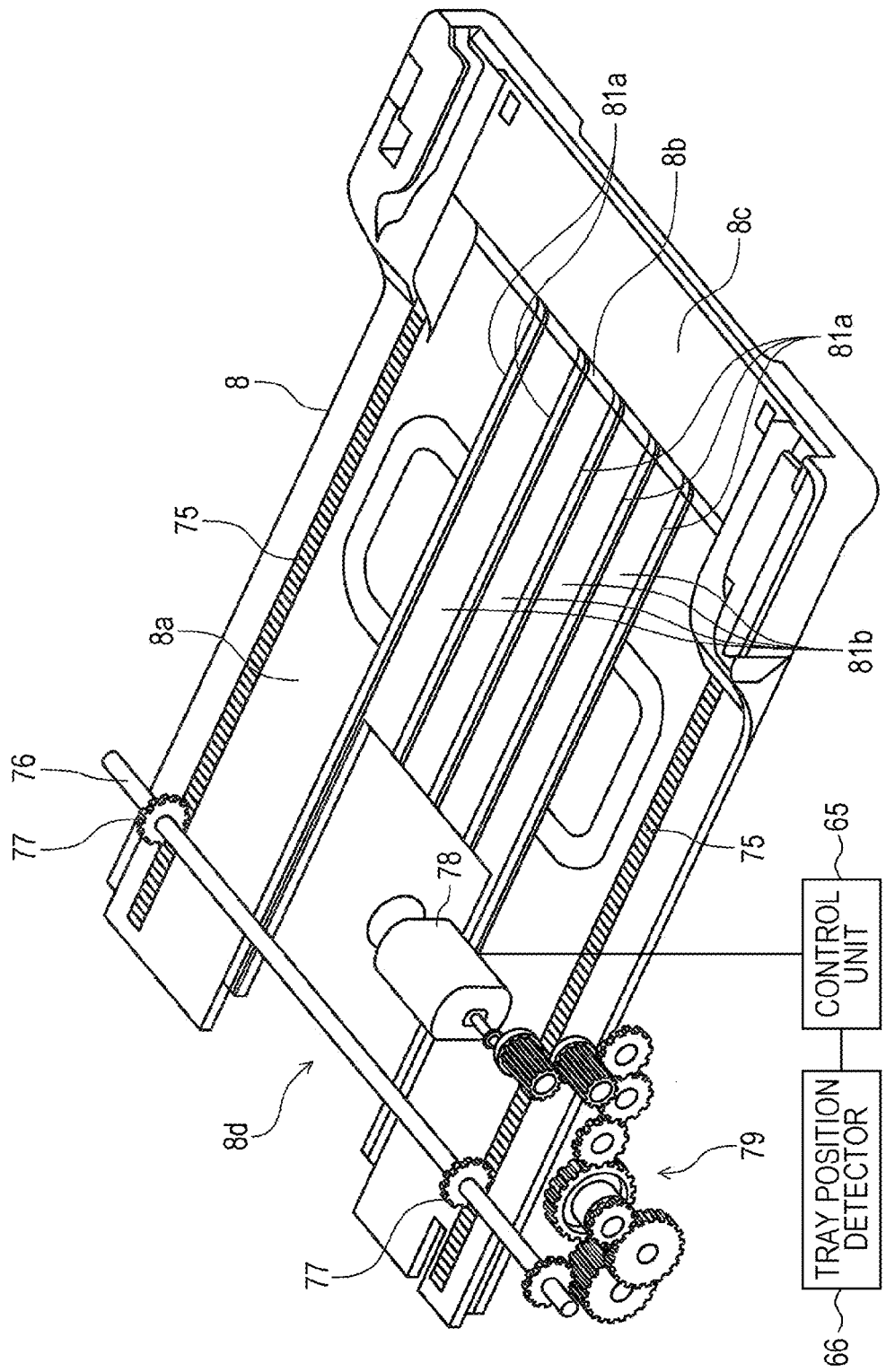
FIG. 7 is another perspective view of the medium receiving tray.

FIG. 6 is a perspective view showing the medium receiving tray 8 and the discharge drive roller 31. FIG. 7 is a perspective view showing the medium receiving tray 8 and a driving mechanism thereof. The driving mechanism of the medium receiving tray 8 includes a pair of racks 75 provided on the respective end portions of the medium receiving tray 8 in the width direction (horizontal direction orthogonal to the medium discharge direction) so as to extend in the moving direction of the medium receiving tray 8, a rotation shaft 76 spanned over the medium receiving tray 8 in the width direction in the vicinity of a region under the discharge drive roller 31 and having the end portions supported by the main body 2, a pair of pinions 77 attached to the rotation shaft 76 and respectively meshed with the pair of racks 75, the motor 78 mounted in the main body 2 and controlled by a control unit 65 to rotate, and a row of gears 79 that transmits the rotative force of the motor 78 to the rotation shaft 76.

With the configuration described above, the medium receiving tray 8 can be shifted between the first state of sticking out in the medium discharge direction (FIG. 4) and the second state of being retracted in a direction opposite to the medium discharge direction (FIG. 3) with the operation panel 5 opened, on the basis of the rotation of the motor 78 controlled by the control unit 65. In the first state (FIG. 4), the medium receiving tray 8 receives the paper sheet P that has undergone the recording operation by the recording head 30 and been discharged by the discharge drive roller 31 and the discharge slave roller 32 constituting the discharge unit.

The control unit 65 is capable of recognizing the position of the medium receiving tray 8 on the basis of a signal from a tray position detector 66. In this embodiment, the tray position detector 66 provides a signal indicating whether the medium receiving tray 8 is at the first position (fully drawn out), at the second position (initial position), or at neither position, to the control unit 65.

The tray position detector 66 may be a mechanical sensor disposed in contact with the medium receiving tray 8, or a non-contact sensor such as an optical sensor. Alternatively, the tray position detector 66 may be constituted of a rotary encoder that detects the rotation of the motor 78. Further, one of the mechanical sensor and the non-contact position sensor may be employed in combination with the rotary encoder. In this case, the control unit 65 may be configured to adjust the position of the medium receiving tray 8 between the first position and the second position, according to the detection information of the medium receiving tray 8 from the tray position detector 66 and the rotating direction and rotation amount of the motor 78.

The cassette cover 53 is made to swing, like the operation panel 5, by the motor 78 installed in the main body 2 such that the upper end portion of the cassette cover 53 opens outward to avoid interference with the movement of the medium receiving tray 8, before the medium receiving tray 8 is driven to stick out from the printer 1 as will be subsequently described.

Here, the operation panel 5 and the cassette cover 53 may be configured to be manually opened and closed. In this case, the printer 5 may be set to start the printing operation upon confirming, with a sensor, that the operation panel 5 and the cassette cover 53 are open.

The medium receiving tray 8 is configured to slide, driven by the motor 78, between the state of being placed inside the main body 2 (FIG. 1, FIG. 3) and the state of sticking out forward from the main body 2 (FIG. 2, FIG. 4) when the operation panel 5 and the cassette cover 53 are open (FIG. 2, FIG. 4). The medium receiving tray 8 can receive the paper sheet discharged after the printing operation, by taking the position of sticking out forward from the main body 2. The details of the medium receiving tray 8, constituting the essential part of the present invention, will be subsequently described.

The printer 1 also includes a manual feed cover 6 that can be manually opened and closed, located at the top of the rear portion of the main body 2. Opening the manual feed cover 6 allows a paper sheet to be supplied by using a manual feed tray 7 (see FIG. 3).

The printer 1 includes the lower cassette 51 and the upper cassette 52 serving as paper sheet containers. These cassettes can be inserted and removed through the cassette insertion slot provided in the lower portion of the front face of the main body 2. The upper cassette 52 includes a rack (not shown) engaged with a pinion (not shown) provided in the main body 2, and the pinion is driven to rotate by a motor (not shown) installed in the main body 2. Such a configuration allows the upper cassette 52 to slide inside the main body 2 between a feeding position (not shown) and a stand-by position (FIGS. 3, 4).

The printer 1 is configured to feed the paper sheets P1 placed in the lower cassette 51 one by one when the upper cassette 52 is at the stand-by position (FIG. 3), and to feed the paper sheet P2 in the upper cassette 52 one by one when the upper cassette 52 is at the feeding position (not shown). Hereafter, the term "paper sheet P" will be employed when the paper sheet P1 in the lower cassette 51 and the paper sheet P2 in the upper cassette 52 do not need to be specifically distinguished.

The pickup roller 10 is located at the distal end of a swinging member 11 set to swing about a pivotal shaft 12, and driven to rotate by a motor (not shown) connected to the pivotal shaft 12 via a row of gears 13 provided on the swinging member 11.

The pickup roller 10 is brought into contact with the uppermost one of the paper sheets P1 in the lower cassette 51, when the upper cassette 52 is at the stand-by position (FIG. 3), i.e., at the frontmost position in the main body 2 (to the right in FIG. 3 which is the removing direction of the medium cassette 50). Thus, the pickup roller 10 feeds the uppermost paper sheet P1 out of the lower cassette 51, upon being made to rotate.

In contrast, when the upper cassette 52 is at the feeding position (not shown), i.e., at the rearmost position of the stroke thereof in the main body 2 (to the left in FIG. 3 which is the insertion direction of the medium cassette 50 and also the feeding direction of the paper sheet), the pickup roller 10 is brought into contact with the uppermost one of the paper sheets P2 in the upper cassette 52, and thus feeds the uppermost paper sheet P2 out of the upper cassette 52, upon being made to rotate.

The main body 2 includes a splitting 14 located so as to oppose the leading end portion of the medium cassette 50 set inside the main body 2, and to form an upward slope. The paper sheet P1 from the lower cassette 51 or the paper sheet P2 from the upper cassette 52 caught by the pickup roller 10 travels downstream in contact with the surface of the splitting slope 14, and thus the uppermost paper sheet to be fed is spit from the second and subsequent paper sheets. Here, three or more independent medium cassettes may be removably provided.

The printer 1 includes the intermediate roller 17 located above the splitting slope 14 (upper position in the rear portion of the main body 2), to be driven to rotate by a motor (not shown) and slave rollers 19, 20 each nipping with the intermediate roller 17, and a guide 18 is provided between the slave rollers 19 and 20. Such a configuration allows the paper sheet P guided upward by the splitting slope 14 to curve along the intermediate roller 17 thus to be reversed and transported toward the front portion of the printer 1, with the transport function of the intermediate roller 17 and the slave roller 19, the guiding function of the guide 18 along the outer circumferential surface of the intermediate roller 17, and the transport function of the intermediate roller 17 and the slave roller 20.

Further, the transport drive roller 24 driven to rotate by a motor (not shown) and the transport slave roller 25 made to rotate by the transport drive roller 24 are provided ahead of the intermediate roller 17 in the transport route of the paper sheet P. The rollers 24, 25 serve to transport the paper sheet P to the recording unit which performs the printing on the paper sheet P.

The recording unit includes the recording head 30 that dispenses ink, the paper sheet support member 28 transversely disposed under and opposite the recording head 30, and a carriage 29 to the bottom portion of which the recording head 30 is attached. The carriage 29 is driven by a motor (not shown) so as to cause the recording head 30 to reciprocate in the main scanning direction orthogonal to the medium transport direction.

The paper sheet support member 28 located under the recording head 30 defines the gap between the paper sheet support member 28 and the recording head 30 through which the paper sheet P is to pass, as well as the gap between the paper sheet P and the recording head 30.

The discharge unit that discharges the paper sheet P that has undergone the printing operation of the recording head 30 is provided downstream of the paper sheet support member 28 in the discharge direction of the paper sheet P. The discharge unit includes the discharge drive roller 31 driven to rotate by a motor (not shown) and the discharge slave roller 32 made to rotate by the discharge drive roller 31 in contact therewith. The paper sheet P that has undergone the printing operation of the recording head 30 is discharged to the medium receiving tray 8 by these rollers 31, 32.

The medium receiving tray 8 will now be described in details. The tray chamber in which the medium receiving tray 8 is accommodated inside the main body 2 is located under the discharge path of the paper sheet P discharged by the discharge drive roller 31 and the discharge slave roller 32. The tray chamber is defined by a ceiling wall 2a provided between the discharge drive roller 31 and the pivotal shaft 12, and by a tray base 2b located above the cassette chamber at the bottom portion inside the main body 2. The ceiling wall 2a and the tray base 2b are supported by the frame 9 (FIG. 8) constituting the base structure of the main body 2.

The medium receiving tray 8 is formed of a resin-molded panel, and the surface for receiving the paper sheet P includes a lower receiving region 8a, a sloped portion 8b, and a higher receiving region 8c. The medium receiving tray 8 has a length that occupies, when set in the initial position inside the printer 1 in the non-operating condition, the region between the inner face of the operation panel 5b in the closed state and the vicinity of the pickup roller 10.

The lower receiving region 8a includes a relief portion (cut-away portion) 8d (FIGS. 6, 7), to avoid interference with the paper sheet feeding unit including the pickup roller 10 and so forth. The leading edge of the relief portion 8d of the medium receiving tray 8 (upper left in FIG. 7) is configured so as to avoid interference with a wall 2c (FIG. 3) downwardly extending from the rearmost end of the ceiling wall 2a.

The sloped portion 8b is upwardly inclined in the medium discharge direction at a position close to the inner face of the operation panel 5.

Further, arcuate surfaces or ribs having a relatively large curvature radius are formed on the boundary between the lower receiving region 8a and the sloped portion 8b, to allow the leading edge of the paper sheet P discharged by the discharge drive roller 31 and the discharge slave roller 32 to smoothly float while passing the boundary between the lower receiving region 8a and the sloped portion 8b as indicated by a solid line in FIG. 4, and to settle on the higher receiving region 8c as indicated by a dot line in FIG. 4.

When the printed paper sheet P is received by the medium receiving tray 8 sticking out as shown in FIG. 4, the leading edge of the paper sheet P protrudes forward from the medium receiving tray 8 in the case where the paper sheet is long. In this case, the paper sheet P might fall off from the medium receiving tray 8 because of the self-weight, if the medium receiving tray 8 did not include the sloped portion 8b and the higher receiving region 8c. However, the paper sheet P can be prevented from protruding forward and downward from the medium receiving tray 8 and then falling off therefrom, by forming the sloped portion 8b and the higher receiving region 8c in the medium receiving tray 8 to cause the leading edge of the paper sheet P discharged over the lower receiving region 8a to float and be received on the higher receiving region 8c.

Since the medium receiving tray 8 of the printer 1 includes higher receiving region 8c as described above, when the printing operation is to be performed the operation panel 5 and the cassette cover 53 are automatically opened before the medium receiving tray 8 is drawn out, as stated earlier.

Figure 9:
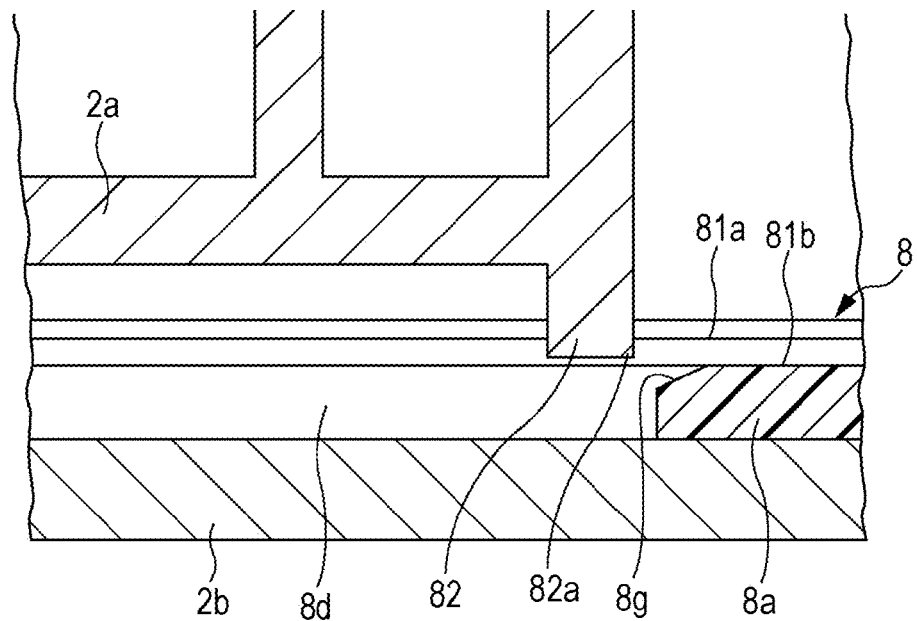
FIG. 9 is an enlarged fragmentary cross-sectional view showing a position of a blocking mechanism, another essential part of the present invention, taken when the medium receiving tray is drawn out for the printing operation.
Figure 10:
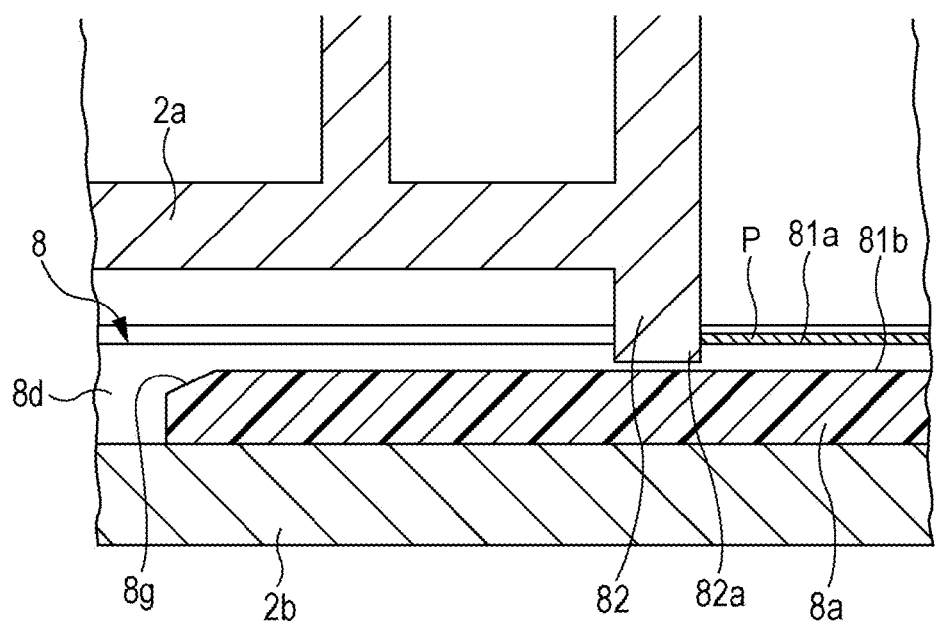
FIG. 10 is an enlarged fragmentary cross-sectional view showing a position of the blocking mechanism taken when the medium receiving tray is retracted after the printing operation.
Figure 11:
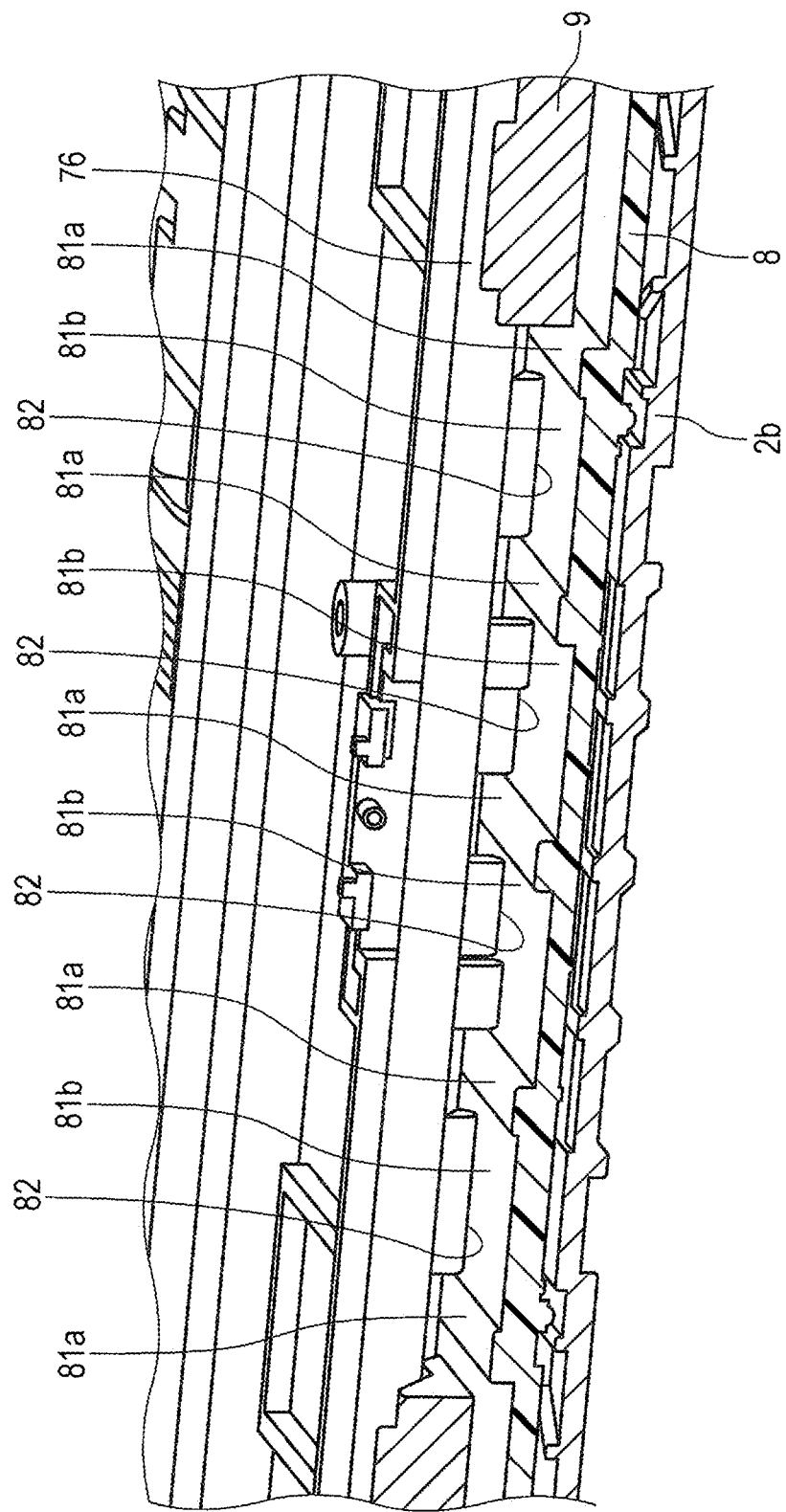
FIG. 11 is a perspective view showing the blocking mechanism.

As shown in FIGS. 3 to 5 and FIGS. 9 to 11, the printer 1 includes a blocking mechanism 80 composed of a plurality of rib portions 81a and a plurality of protruding portions 82. FIG. 9 is a fragmentary cross-sectional view showing a position of the blocking mechanism taken when the medium receiving tray is drawn out for the printing operation. FIG. 10 is a fragmentary cross-sectional view showing a position of the blocking mechanism taken when the medium receiving tray is retracted after the printing operation. FIG. 11 is a perspective view of the blocking mechanism.

The blocking mechanism 80 is shifted from the state shown in FIG. 9 to the state shown in FIG. 10 while the medium receiving tray 8 is shifted from the first state (FIG. 4) to the second state (FIG. 3), thus to be engaged with the trailing edge of the medium to restrict the medium from being drawn inside the main body 2.

Further details will be described hereunder. The locking mechanism 80 includes the plurality of rib portions 81a formed on the medium receiving tray 8 so as to extend in the moving direction thereof, in a forward portion of the lower receiving region 8a except for the relief portion 8d (on the side of the sloped portion 8b) and the respective sides of that forward portion, grooves 81b formed between the adjacent rib portions 81a, and the plurality of protruding portions 82 extending downward from the front end portion of the ceiling wall 2a (right end in FIG. 4) defining the tray chamber. The protruding portions 82 each intrude in the corresponding groove 81b without making contact therewith, so as to form a comb-tooth configuration.

The blocking mechanism 80 is engaged with the trailing edge of the paper sheet P when the medium receiving tray 8, on which the protruding portions 82 are located inside the corresponding grooves 81b without contact, is shifted from the first state (FIG. 4) to the second state (FIG. 3), thus to restrict the paper sheet P from being drawn inside.

In case that the user accidentally inputs the instruction to finish the printing operation without collecting the paper sheet P received in the medium receiving tray 8 sticking out as shown in FIG. 4 and then the medium receiving tray 8 is retracted in the direction opposite to the medium discharge direction as shown in FIG. 3, i.e., when the medium receiving tray 8 is shifted from the first state to the second state, the paper sheet P on the medium receiving tray 8 is drawn into the main body 2 together with the medium receiving tray 8. However, the protruding portions 82 located inside the corresponding grooves 81b, constituting the blocking mechanism 80, are engaged with the trailing edge (inner edge) of the paper sheet P as shown in FIGS. 9 to 11, thus to restrict the paper sheet P from being drawn inside.

Accordingly, the medium is prevented from being caught and jammed in the gap between the medium receiving tray 8 and the ceiling wall 2a defining the chamber for the medium receiving tray 8, which assures that the medium receiving tray 8 returns to the initial position thus avoiding a system error of the printer 1.

Since the blocking mechanism 80 includes a plurality of sets of the groove 81b formed between the adjacent rib portions 81a and the protruding portion 82 intruding in the groove 81b, the plurality of protruding portions 82 are respectively engaged with a plurality of positions of the trailing edge of the paper sheet P. Therefore, the paper sheet P can be prevented from skewing when blocked by the blocking mechanism 80, and hence from being drawn inside because of the skewed orientation.

As shown in FIG. 11, the rib portions 81a and the grooves 81b extend in the medium discharge direction on the upper surface of the medium receiving tray 8. The grooves 81b are formed in different depths. Such a configuration increases the sectional coefficient of the medium receiving tray 8 in the width direction, and disperses stress generated by an external force, thereby enabling the necessary strength to be secured.

As shown in FIG. 9, the front edge 82a of the protruding portion 82 is formed as a right-angled corner, and the corner portion 8g of the upper surface of the medium receiving tray 8 that passes under the protruding portion 82 is chamfered. Such a configuration makes it even less likely that the paper sheet P is drawn into the gap between the medium receiving tray 8 and the ceiling wall 2a.

Figure 12:
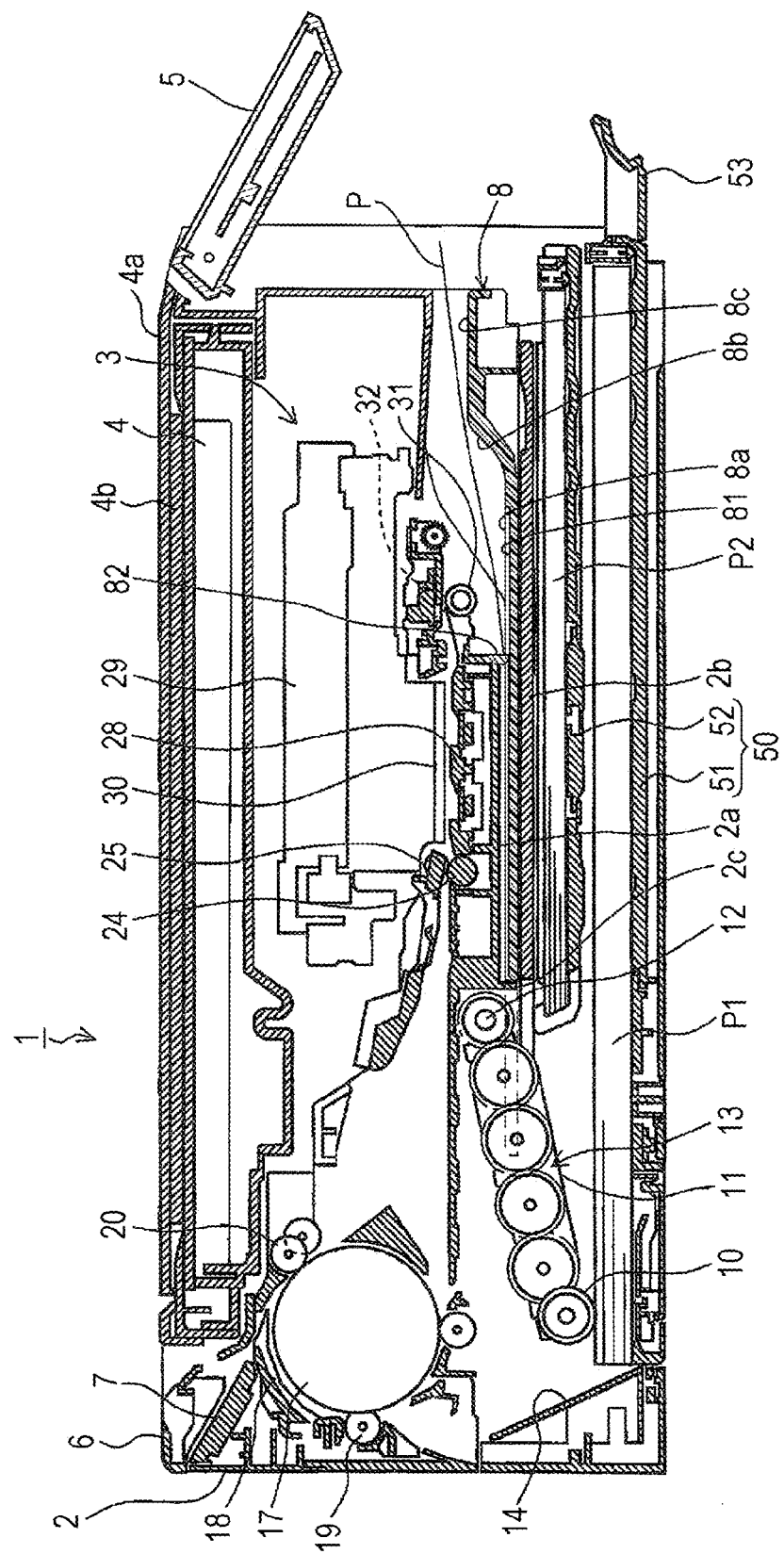
FIG. 12 is a side cross-sectional view of the ink jet printer shown in FIG. 1 taken along the medium transport route, showing a state after the printing operation.

FIG. 12 illustrates a state where a small-sized paper sheet (postcard) P has been printed and the medium receiving tray 8 has been shifted from the first state to the second state with the paper sheet (postcard) P remaining on the medium receiving tray 8. In FIG. 5, illustrating the state before shifting to the state of FIG. 12, the paper sheet (postcard) P is discharged by the discharge drive roller 31 and the discharge slave roller 32 as indicated by a solid line, and settles on the lower receiving region 8a as indicated by a dot line.

While the medium receiving tray 8 is being shifted from the first state to the second state, the grooves 81b and the protruding portions 82 constituting the blocking mechanism 80 are engaged with the trailing edge of the small-sized paper sheet (postcard) P so as to restrict the paper sheet (postcard) P from following the retreating movement of the medium receiving tray 8. Accordingly, the paper sheet (postcard) P can be prevented from having the trailing end caught between the ceiling wall 2a and the portion of the lower receiving region 8a in the medium receiving tray 8 corresponding to the ceiling wall 2a, and also the user can notice that the paper sheet (postcard) P, which is a small-sized medium, has not been collected because the leading edge of the paper sheet (postcard) P sticks out from the medium receiving tray 8 when the medium receiving tray 8 is retracted, as shown in FIG. 12.

As described above, the printer 1 according to this embodiment has the function to let the user notice that the small-sized paper sheet (postcard) P has not been collected. To be more detailed, a small-sized medium is received in an inner portion of the medium receiving tray 8. Accordingly, the small-sized medium is difficult to recognize unless the user intentionally looks into the main body 2, and hence prone to be left unremoved. With the printer 1 according to this embodiment, however, the paper sheet P is prevented from being drawn inside despite the medium receiving tray 8 being retracted, and the leading edge of the paper sheet P sticks out from the main body 2. Therefore, the visual appearance of the printer 1 largely changes so that the user can readily recognize that the paper sheet P has not been removed, thus significantly reducing the risk that the small-sized medium is left unremoved.

Second Embodiment

Figure 13:
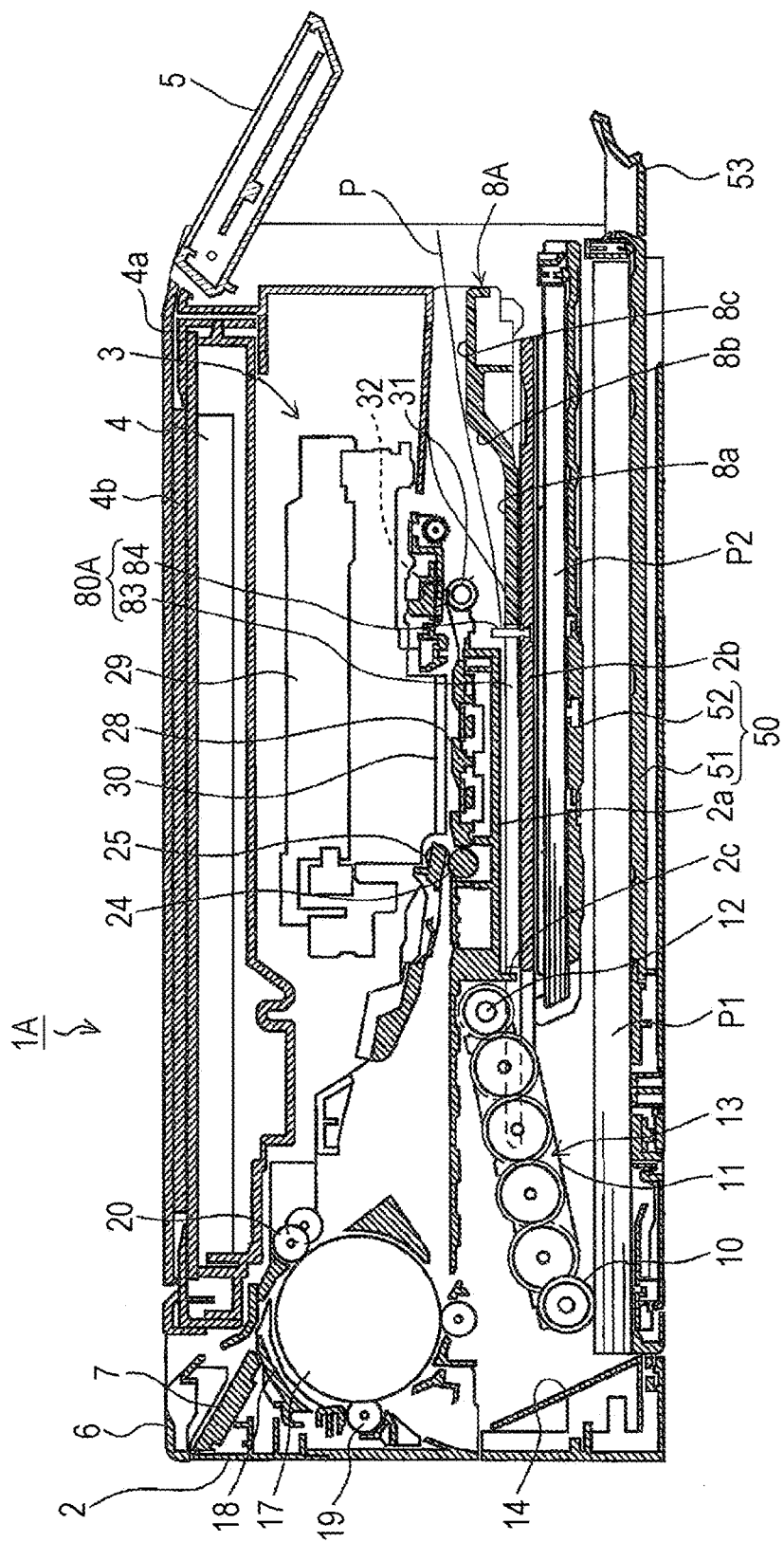
FIG. 13 is a side cross-sectional view of an ink jet printer according to a second embodiment of the present invention taken along the medium transport route, showing a state after the printing operation.
Figure 14:
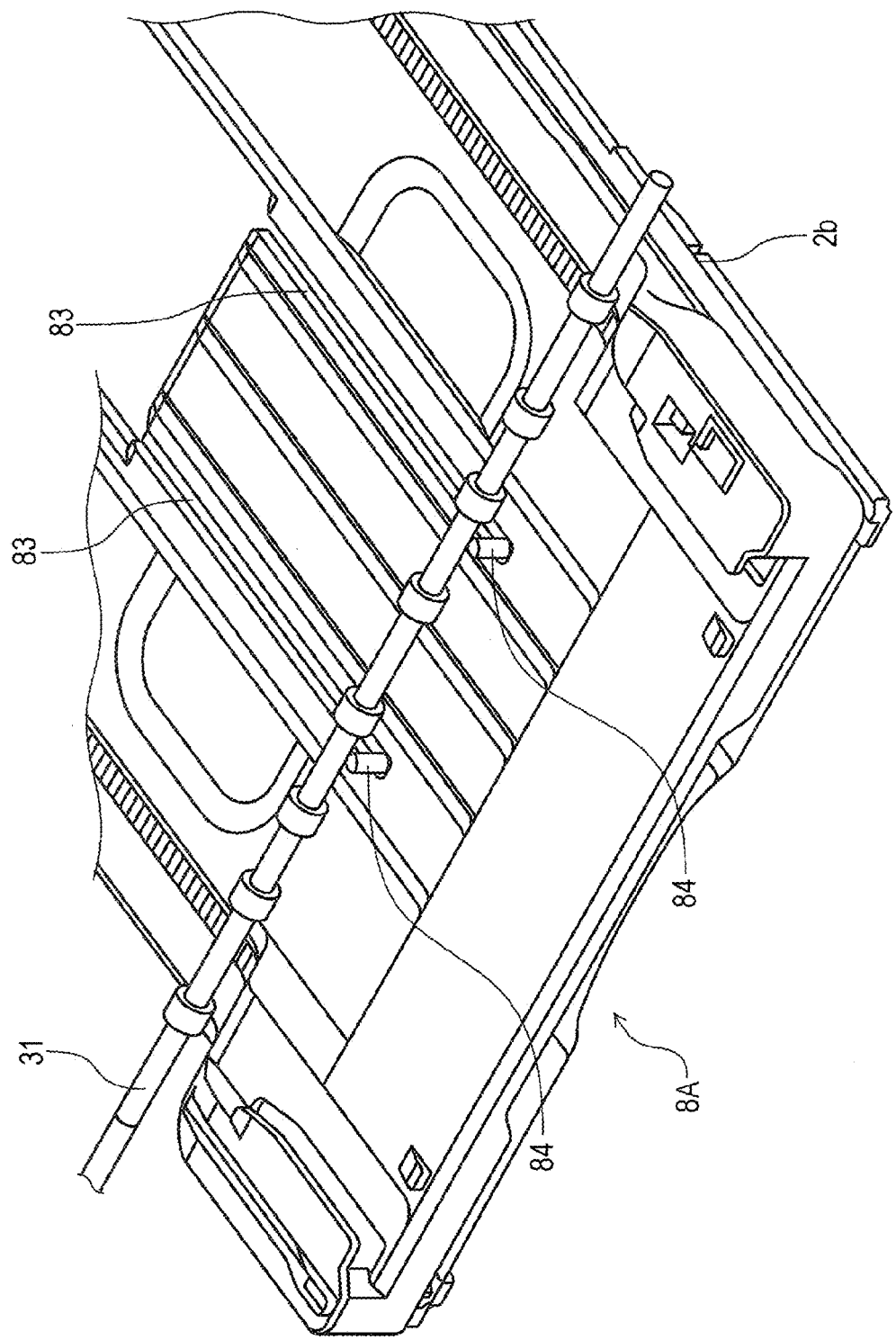
FIG. 14 is a fragmentary perspective view for explaining the operation of the medium receiving tray.
Figure 15:
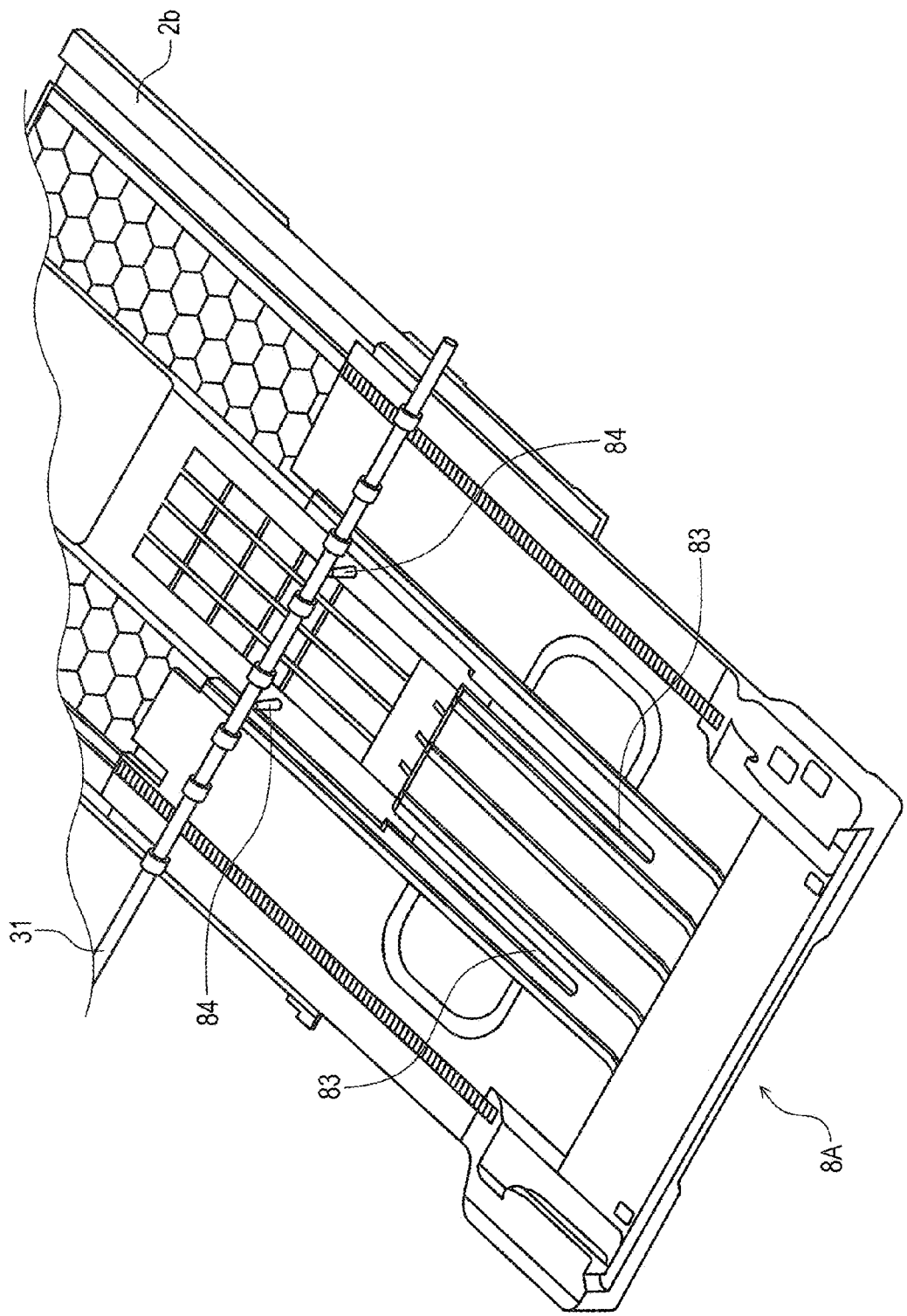
FIG. 15 is a fragmentary perspective view for explaining the operation of the medium receiving tray.
Figure 16:
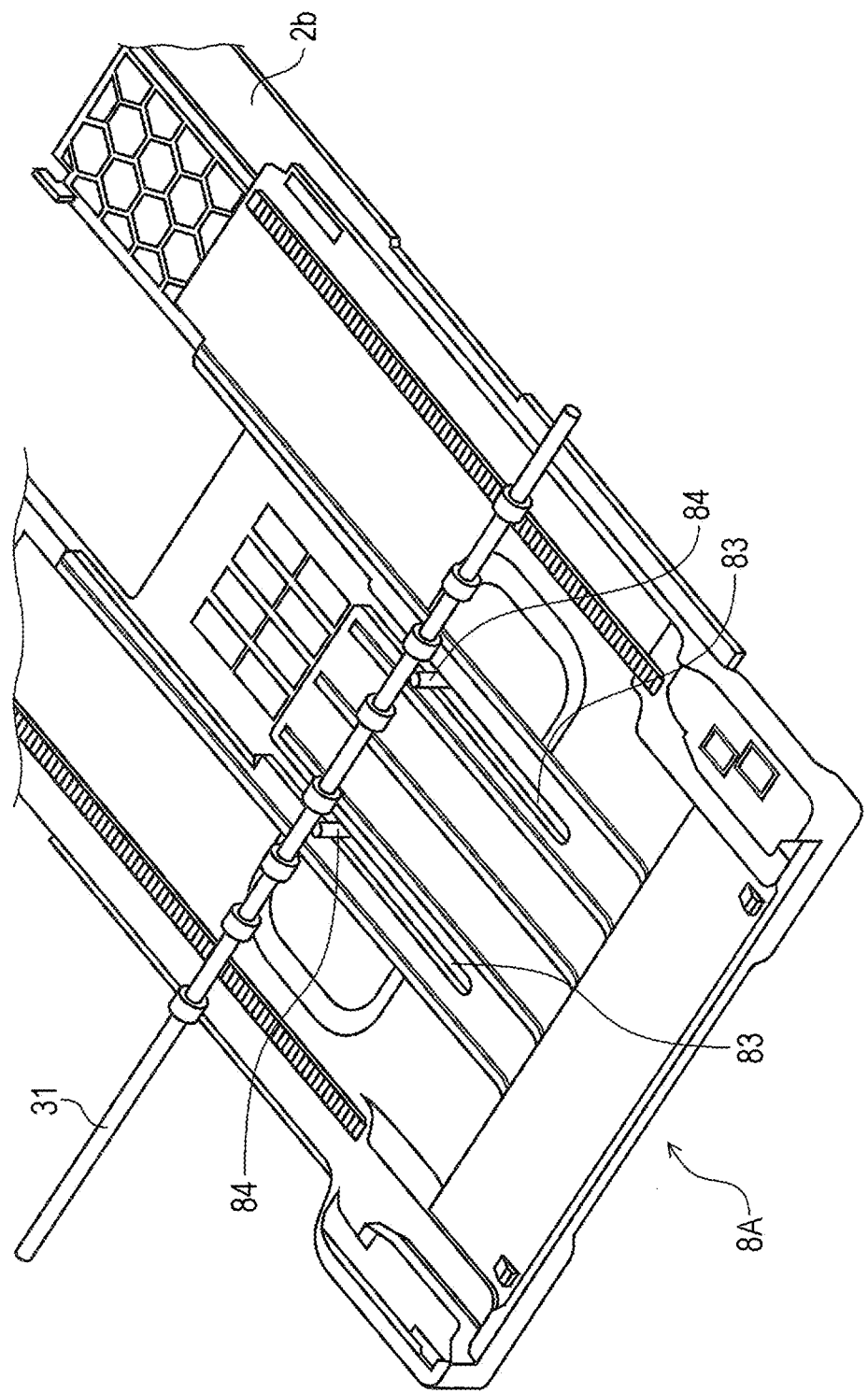
FIG. 16 is a fragmentary perspective view for explaining the operation of the medium receiving tray.
Figure 17:
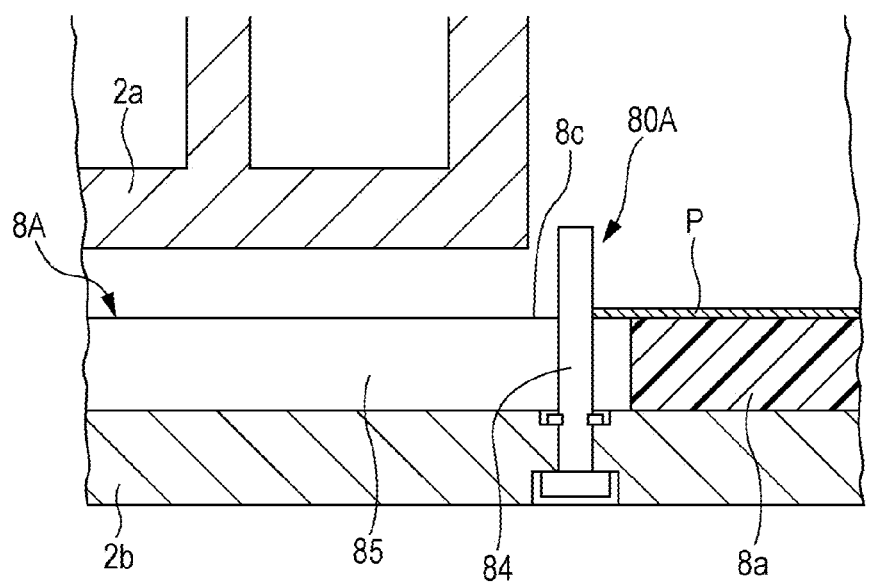
FIG. 17 is an enlarged fragmentary cross-sectional view showing a position of another blocking mechanism taken when the medium receiving tray is retracted after the printing operation.

FIG. 13 is a side cross-sectional view showing a state of the medium transport route after the printing operation, in a printer 1A representing a second embodiment of the recording apparatus according to the present invention. FIGS. 14 to 16 are perspective views for explaining the operation of a medium receiving tray constituting an essential part of the present invention. FIG. 17 is a fragmentary cross-sectional view showing a position of a blocking mechanism taken when the medium receiving tray is retracted after the printing operation.

FIGS. 13 to 17 illustrate the blocking mechanism 80A including slits 83 and projecting portions 84. The slits 83 are formed in the medium receiving tray 8A so as to extend in the medium discharge direction, and the projecting portions 84 are erected on the tray base 2b supporting the medium receiving tray 8A, so as to upwardly protrude from the surface of the lower receiving region 8a.

FIGS. 14 to 16 show the operation process of the medium receiving tray 8A. FIG. 14 illustrates the second state in which the medium receiving tray 8A is retracted in the direction opposite to the medium discharge direction. FIG. 15 illustrates the first state in which the medium receiving tray 8A is drawn out in the medium discharge direction. FIG. 16 illustrates the transition phase of the medium receiving tray 8A from the first state to the second state.

The projecting portion 84 intrudes in the slit 83 of the medium receiving tray 8A and sticks upward from the upper surface of the medium receiving tray 8A so as to be engaged with the trailing edge of the paper sheet P, while the medium receiving tray 8A is being shifted from the first state of sticking out in the medium discharge direction to the second state of being retracted in the direction opposite to the medium discharge direction, as shown in FIG. 13.

Therefore, as in the first embodiment, when the medium receiving tray 8A is retracted in the direction opposite to the medium discharge direction with the paper sheet P left thereon unremoved, i.e., when the medium receiving tray 8A is shifted from the first state to the second state, the projecting portion 84 is engaged with the trailing edge of the paper sheet P as shown in FIG. 17, thus to restrict the paper sheet P from being drawn inside., The printer 1A includes a plurality of sets of the slit 83 and the projecting portion 84 to intrude thereinto (two sets in FIGS. 14 to 16). Accordingly, the plurality of projecting portions 84 are respectively engaged with a plurality of positions of the trailing edge of the paper sheet P, thereby preventing the paper sheet P from skewing when blocked by the blocking mechanism 80, and hence from being drawn inside because of the skewed orientation.

The printer 1A according to the second embodiment is different from the printer 1 according to the first embodiment only in the configuration of the blocking mechanism 80A, and the remaining portions have the same configuration as that of the first embodiment. Therefore, the description of the configuration of the printer 1A other than the blocking mechanism 80A will not be repeated. Here, as a variation of this embodiment, the projecting portion 84 may be formed so as to extend downward from the ceiling wall 2a so as to intrude into the slit 83. However, such a configuration is substantially the same as that of the first embodiment.

Third Embodiment

Figure 18:
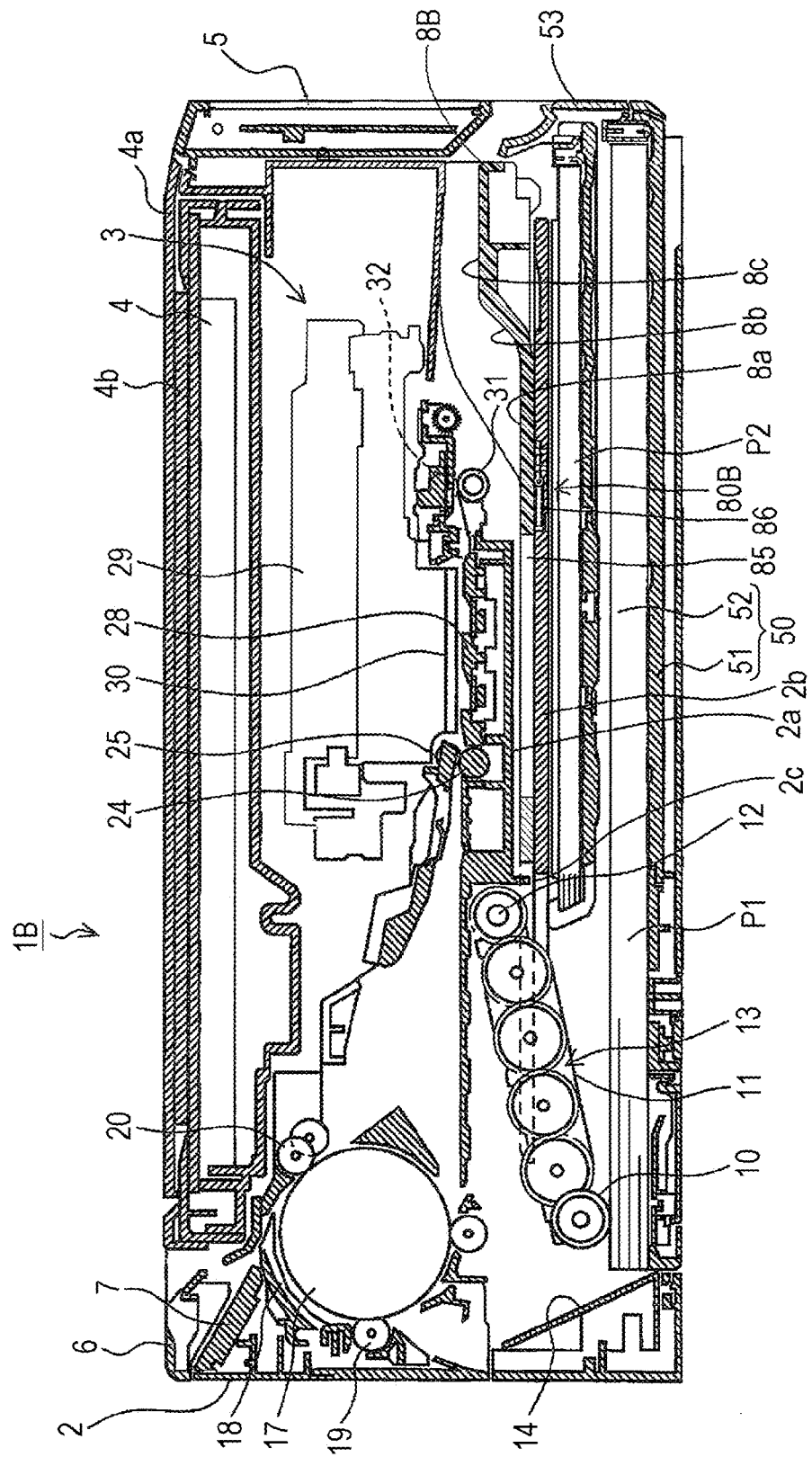
FIG. 18 is a side cross-sectional view of an ink jet printer according to a third embodiment of the present invention taken along the medium transport route, in the non-operating condition.
Figure 19:
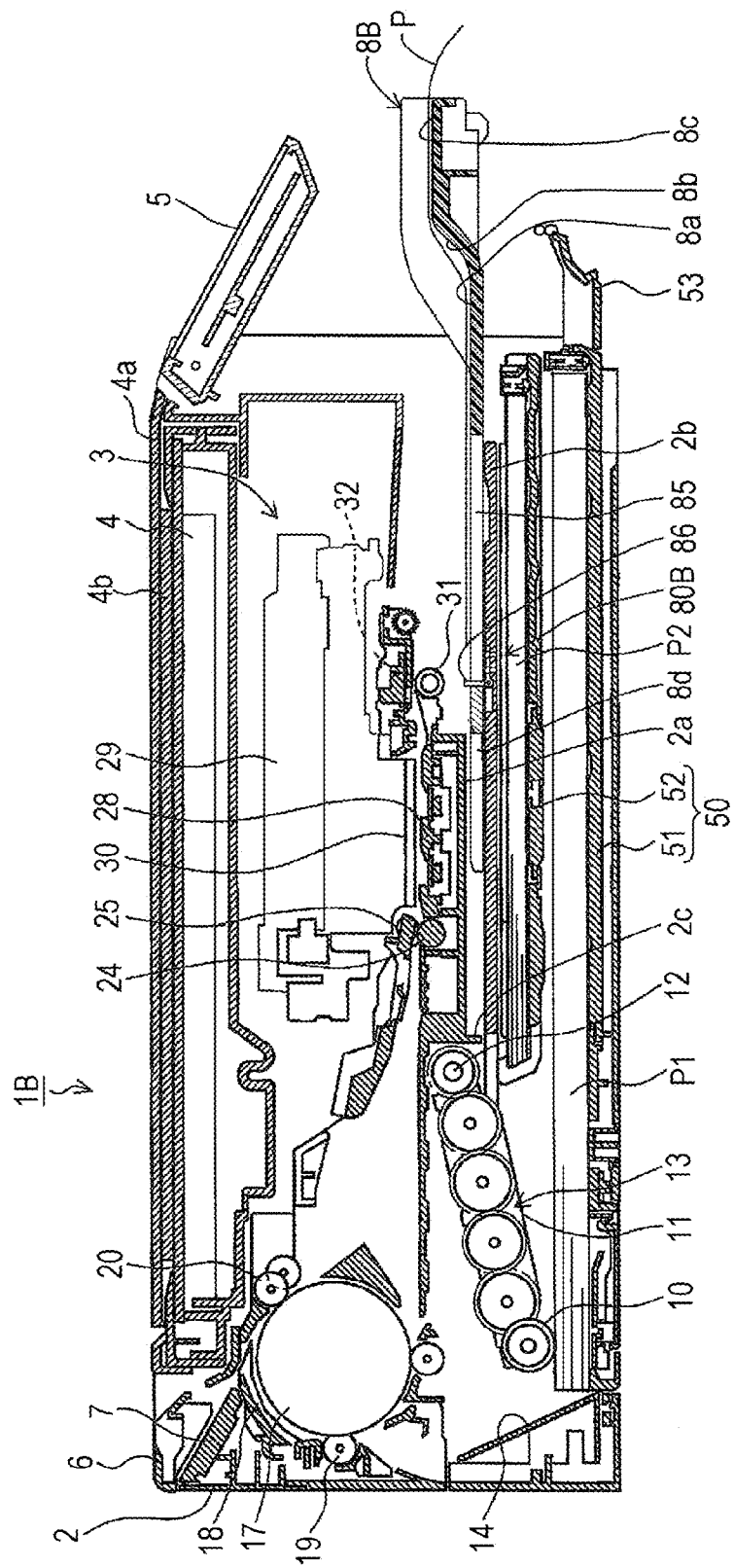
FIG. 19 is a side cross-sectional view of the ink jet printer shown in FIG. 18 taken along the medium transport route, in the operating condition.
Figure 20:
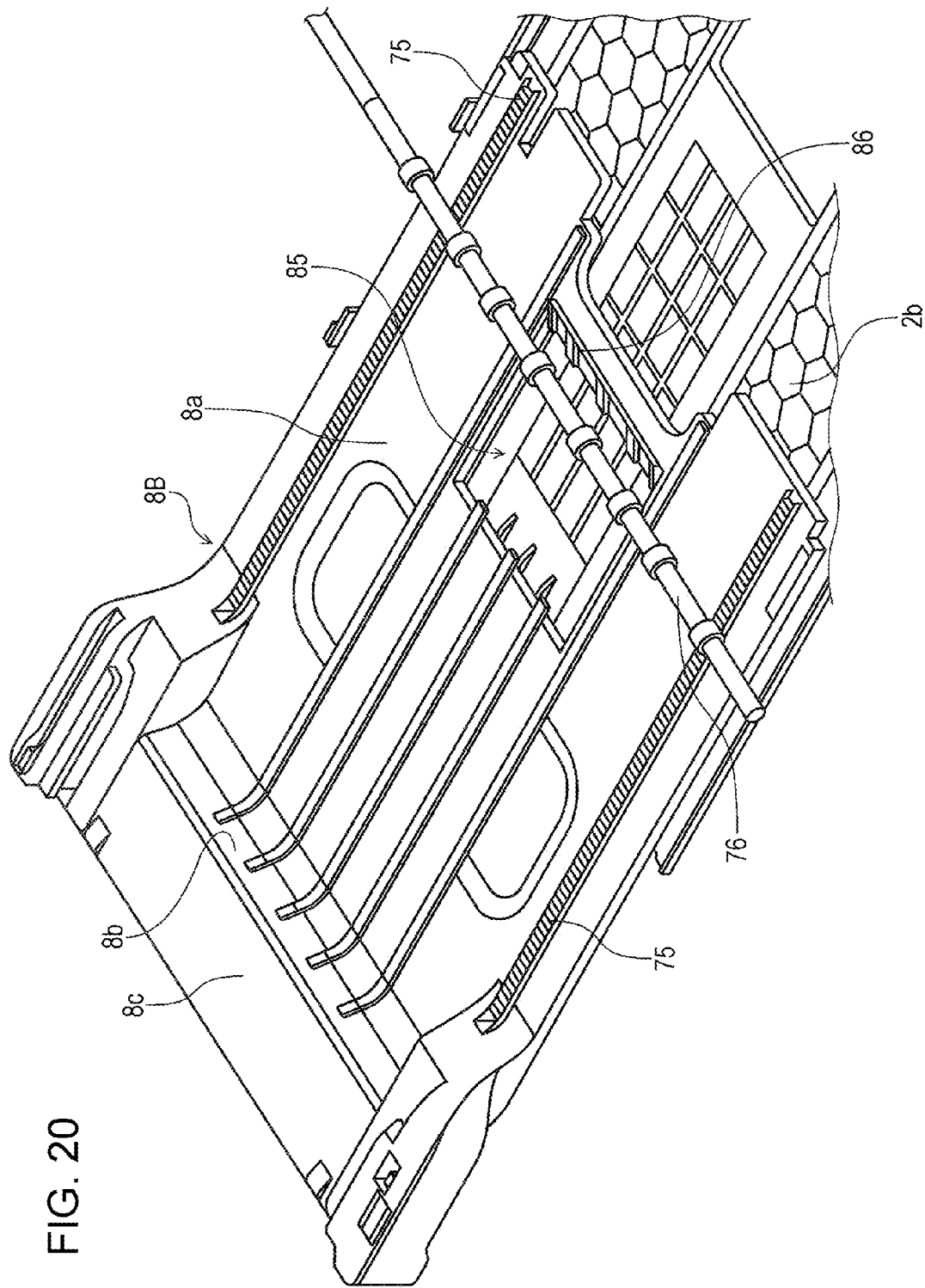
FIG. 20 is a perspective view showing an essential portion of another medium receiving tray.
Figure 21:
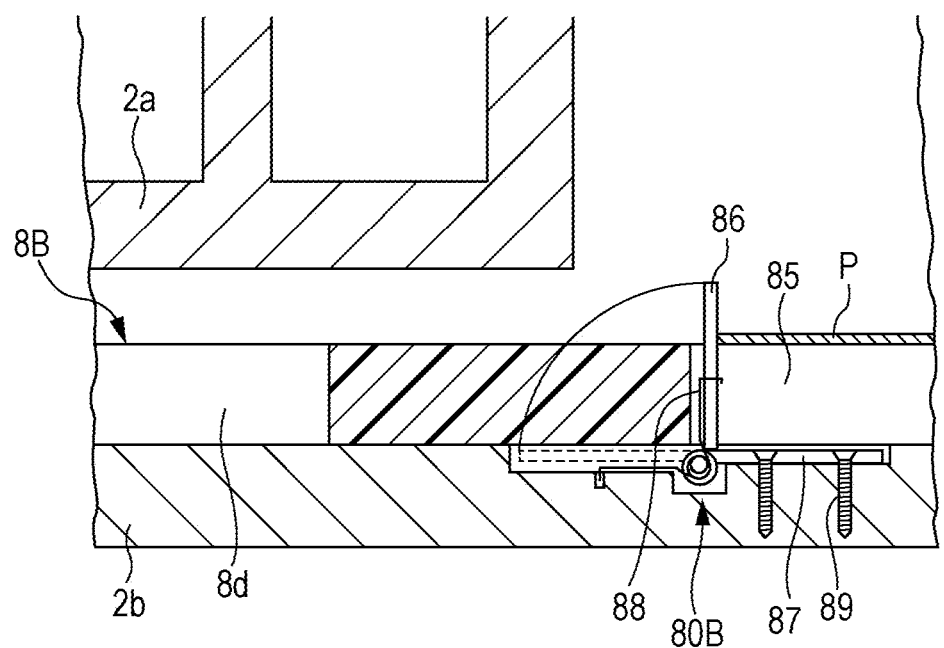
FIG. 21 is an enlarged fragmentary cross-sectional view showing a position of another blocking mechanism taken when the medium receiving tray is retracted after the printing operation.

FIG. 18 is a side cross-sectional view of a printer 1B, representing a third embodiment of the recording apparatus according to the present invention, taken along the medium transport route in the non-operating condition. FIG. 19 is a side cross-sectional view of the printer 1B in the operating condition, taken along the medium transport route. FIG. 20 is a perspective view showing a medium receiving tray 8B. FIG. 21 is a fragmentary cross-sectional view showing a position of a blocking mechanism 80B taken when the medium receiving tray 8B is retracted after the printing operation. FIGS. 18 to 21 illustrate the blocking mechanism 80B composed of a cut-away portion 85 in the medium receiving tray 8B and flaps 86 provided on the tray base 2b.

As shown in FIG. 21, the flap 86 is connected to an edge portion of a fixing plate 87 attached to a groove of the tray base 2b with screws 89. In the non-operating condition, the flap 86 is laid down by the medium receiving tray 8B into the groove of the tray base 2b, and buried under the medium receiving tray 8B (laid-down position shown in FIG. 18), and when the cut-away portion 85 formed in the medium receiving tray 8B is located so as to correspond to the flap 86, the flap 86 is erected by 90° by a torsion spring 88 serving as a biasing unit (upright position shown in FIGS. 19, 21).

To be more detailed, the flap 86 is laid down by the medium receiving tray 8B and buried thereunder as shown in FIG. 18, when the medium receiving tray 8B is in the second state of being retracted in the direction opposite to the medium discharge direction into the initial position in the printer 1B.

When the medium receiving tray 8B sticks out in the medium discharge direction by a predetermined length so that the cut-away portion 85 reaches the position corresponding to the flap 86, the biasing force of the biasing unit 88 allows the flap 86 to swing upward and take the upright position as shown in FIGS. 19 and 21. The flap 86 maintains the upright position until the cut-away portion 85 is no longer at the position corresponding to the flap 86 (until the cut-away portion 85 passes over the flap 86) when the medium receiving tray 8B is shifted from the first state to the second state.

Therefore, when the medium receiving tray 8B is retracted in the direction opposite to the medium discharge direction with the paper sheet P left thereon unremoved, i.e., when the medium receiving tray 8B is shifted from the first state to the second state, the flap 86 constituting the blocking mechanism is engaged with the trailing edge of the paper sheet P as shown in FIG. 21, thus to restrict the paper sheet P from being drawn inside.

The printer 1B according to the third embodiment is different from the printer 1 according to the first embodiment only in the configuration of the blocking mechanism 80B, and the remaining portions have the same configuration as in the first embodiment. Therefore, the description of the configuration of the printer 1B other than the blocking mechanism 80B will not be repeated.

The entire disclosure of Japanese Patent Application No.2012-079655, filed Mar. 30, 2012, is expressly incorporated by reference herein.

What is claimed is:

1. A recording apparatus comprising:
   a recording unit that performs a recording operation on a medium;
   a discharge unit that discharges the medium that has undergone the recording operation by the recording unit;
   a medium receiving tray that receives the medium discharged from the discharge unit, the medium receiving tray being shiftable between a first state in which the medium receiving tray is drawn out in a medium discharge direction and a second state in which the medium receiving tray is retracted in a direction opposite to the medium discharge direction; and
   a blocking mechanism configured to be engaged with a trailing edge of the medium while the medium receiving tray is shifted from the first state to the second state, and to restrict the medium from being drawn inside,
   wherein the blocking mechanism includes:
   a plurality of rib portions formed on an upper face of the medium receiving tray, the rib portion extending in the medium discharge direction and being aligned in a direction intersecting the medium discharge direction; and
   a plurality of protruding portions formed on a tray chamber in which the medium receiving tray is accommodated, so as to intrude in a space between the rib portions.

2. The recording apparatus according to claim 1,
   wherein the blocking mechanism further includes:
   a slit formed in the medium receiving tray so as to extend in the medium discharge direction; and
   a projecting portion formed on the tray chamber in which the medium receiving tray is accommodated, so as to intrude into the slit and stick out from a medium receiving surface of the medium receiving tray.

3. The recording apparatus according to claim 2,
   wherein the projecting portion is formed so as to penetrate through the medium receiving surface of the medium receiving tray and stick out from the medium receiving surface.

4. The recording apparatus comprising:
   a recording unit that performs a recording operation on a medium;
   a discharge unit that discharges the medium that has undergone the recording operation by the recording unit;
   a medium receiving tray that receives the medium discharged from the discharge unit, the medium receiving tray being shiftable between a first state in which the medium receiving tray is drawn out in a medium discharge direction and a second state in which the medium receiving tray is retracted in a direction opposite to the medium discharge direction; and
   a blocking mechanism configured to be engaged with a trailing edge of the medium while the medium receiving tray is shifted from the first state to the second state, and to restrict the medium from being drawn inside, wherein the blocking mechanism includes:
   a cut-away portion formed in the medium receiving tray;
   a flap provided in the tray chamber in which the medium receiving tray is accommodated, so as to swing between a laid-down position and an upright position; and a biasing unit that urges the flap toward the upright position, and the flap is pressed down so as to take the laid-down position by the medium receiving tray when the medium receiving tray is in the second state, when the medium receiving tray is shifted from the second state to the first state, the cut-away portion allows the flap to swing so as to take the upright position from the laid-down position, and to maintain the upright position until the cut-away portion passes the flap while the medium receiving tray is shifted from the first state to the second state.

5. The recording apparatus according to claim 1,
   wherein the medium receiving tray includes a sloped portion formed on a downstream side in the medium discharge direction, so as to upwardly incline the leading edge of the medium.

6. The recording apparatus according to claim 1,
   wherein the blocking mechanism includes a plurality of sets of the rib portions and the protruding portions, each set including two rib portions and one protruding portion located therebetween.

7. The recording apparatus according to claim 2,
   wherein the blocking mechanism includes a plurality of sets of the slit and the corresponding projecting portion.

8. The recording apparatus according to claim 6,
   wherein regions between the rib portions constituting the plurality of sets are formed in different depths.

9. The recording apparatus according to claim 1,
   wherein a front edge of the protruding portion is formed as a right-angled corner, and a corner portion of the upper surface of the medium receiving tray that passes under the protruding portion is chamfered.

10. The recording apparatus according to claim 1, wherein the medium receiving tray is automatically shiftable between the first state and the second state.

11. The recording apparatus according to claim 4, wherein the medium receiving tray is automatically shiftable between the first state and the second state.

* * * * *